US011827173B2

(12) United States Patent
Freisler et al.

(10) Patent No.: US 11,827,173 B2
(45) Date of Patent: Nov. 28, 2023

(54) AIRBAG MODULE, VEHICLE SEAT HAVING AN AIRBAG MODULE, AND VEHICLE

(71) Applicant: ZF AUTOMOTIVE GERMANY GMBH, Alfdorf (DE)

(72) Inventors: Werner Freisler, Schwäbisch Gmünd (DE); Theresa Betz, Schwäbisch Gmünd (DE); Frederic Myers, Reutlingen (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 17/619,652

(22) PCT Filed: Jun. 15, 2020

(86) PCT No.: PCT/EP2020/066419
§ 371 (c)(1),
(2) Date: Dec. 16, 2021

(87) PCT Pub. No.: WO2020/254218
PCT Pub. Date: Dec. 24, 2020

(65) Prior Publication Data
US 2022/0355758 A1 Nov. 10, 2022

(30) Foreign Application Priority Data

Jun. 19, 2019 (DE) ...................... 10 2019 116 586.5

(51) Int. Cl.
*B60R 21/233* (2006.01)
*B60R 21/207* (2006.01)
(Continued)

(52) U.S. Cl.
CPC .......... *B60R 21/233* (2013.01); *B60R 21/207* (2013.01); *B60R 21/263* (2013.01); *B60R 21/237* (2013.01); *B60R 2021/2074* (2013.01)

(58) Field of Classification Search
CPC ... B60R 21/233; B60R 21/207; B60R 21/263; B60R 2021/2074; B60R 21/268;
(Continued)

(56) References Cited

U.S. PATENT DOCUMENTS 5,752,714 A * 5/1998 Pripps ................... B60R 21/207
280/730.2
8,702,123 B2 * 4/2014 Mazanek ............... B60R 21/207
280/730.2
(Continued)

FOREIGN PATENT DOCUMENTS

CN 103538549 A * 1/2014 ............. B60R 21/08
DE 102009021635 A1 * 11/2010 ........... B60R 21/207
(Continued)

OTHER PUBLICATIONS

Palo et al. DE 10 2009 021635, Side airbag unit, vehicle seat, and motor vehicle, Machine English Translation, ip.com (Year: 2010).*
(Continued)

*Primary Examiner* — Karen Beck
(74) *Attorney, Agent, or Firm* — TAROLLI, SUNDHEIM, COVELL & TUMMINO L.L.P.

(57) ABSTRACT

The invention relates to an airbag module (12) comprising a restraint airbag (30) which is inflated in a situation of restraint and, in an inflated state, has a restraining effect on an occupant (16), and at least one backup member (36, 36*a*, 36*b*) which, in a restraining state, is at least in portions in contact with the inflated restraint airbag (30) and is configured so that it backs the restraint airbag (30) and in particular absorbs a force (F) applied to the restraint airbag (30) by contacting a vehicle occupant (16), wherein, in the inflated state, the restraint airbag (30) is interposed between the backup member (36, 36*a*, 36*b*) and the vehicle occupant (16), wherein the backup member (36, 36*a*, 36*b*) is arranged, in an initial state, on or in the airbag module. The invention
(Continued)

also relates to a vehicle seat and a vehicle comprising an airbag module according to the invention.

22 Claims, 19 Drawing Sheets

(51) Int. Cl.
*B60R 21/263* (2011.01)
*B60R 21/237* (2006.01)

(58) Field of Classification Search
CPC .... B60R 2021/161; B60R 2021/23308; B60R 21/23138; B60R 2021/23107; B60R 2021/23146; B60R 2021/022
See application file for complete search history.

(56) References Cited

U.S. PATENT DOCUMENTS

| | | | |
|---|---|---|---|
| 9,561,765 B1* | 2/2017 | Barbat | B60R 19/205 |
| 10,077,020 B2 | 9/2018 | Raikar et al. | |
| 11,235,724 B2* | 2/2022 | Kobayashi | B60R 21/23138 |
| 2004/0256842 A1 | 12/2004 | Breed | |
| 2006/0192465 A1* | 8/2006 | Kornbluh | H02N 1/006 |
| | | | 310/309 |
| 2010/0230937 A1* | 9/2010 | Thomas | B60R 21/216 |
| | | | 280/728.3 |
| 2012/0181896 A1* | 7/2012 | Kornbluh | B64C 3/48 |
| | | | 310/300 |
| 2016/0082915 A1 | 3/2016 | Madaras | |
| 2017/0028955 A1 | 2/2017 | Ohno et al. | |
| 2017/0291565 A1 | 10/2017 | Yamamoto et al. | |
| 2019/0047504 A1* | 2/2019 | Sugishima | B60R 21/207 |
| 2022/0097644 A1* | 3/2022 | Jaradi | B60R 21/013 |
| 2022/0289132 A1* | 9/2022 | Kang | B60R 21/231 |

FOREIGN PATENT DOCUMENTS

| | | | | |
|---|---|---|---|---|
| DE | 102009021635 A1 | | 11/2010 | |
| DE | 102010009321 A1 | | 7/2011 | |
| DE | 102012213284 A1 | * | 2/2014 | B60R 21/207 |
| DE | 102014013649 A1 | * | 3/2016 | B60R 21/231 |
| DE | 102014226745 A1 | | 6/2016 | |
| DE | 102018129089 A1 | | 5/2019 | |
| KR | 20100128057 A | * | 12/2000 | |
| WO | WO-9628318 A1 | * | 9/1996 | B60N 2/806 |
| WO | WO-2011056128 A1 | * | 5/2011 | B60R 21/207 |
| WO | WO-2021053073 A1 | * | 3/2021 | |
| WO | WO-2023014312 A1 | * | 3/2021 | |

OTHER PUBLICATIONS

PCT International Search Report for corresponding International Application Serial No. PCT/EP2020/066419, dated Jul. 24, 2020, pp. 1-4.

* cited by examiner

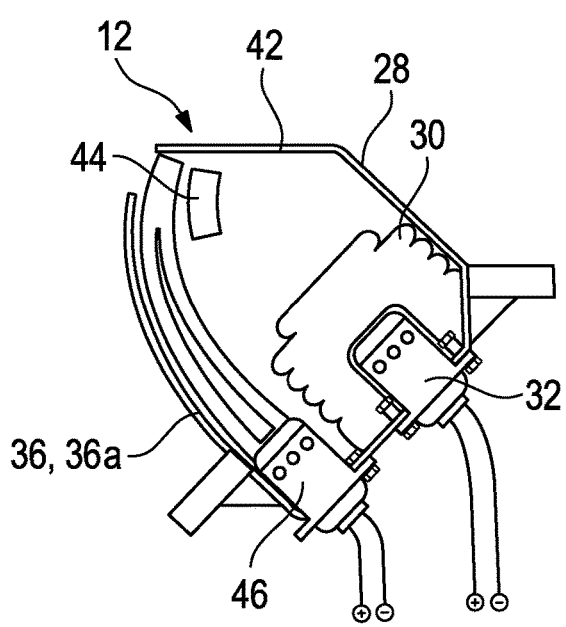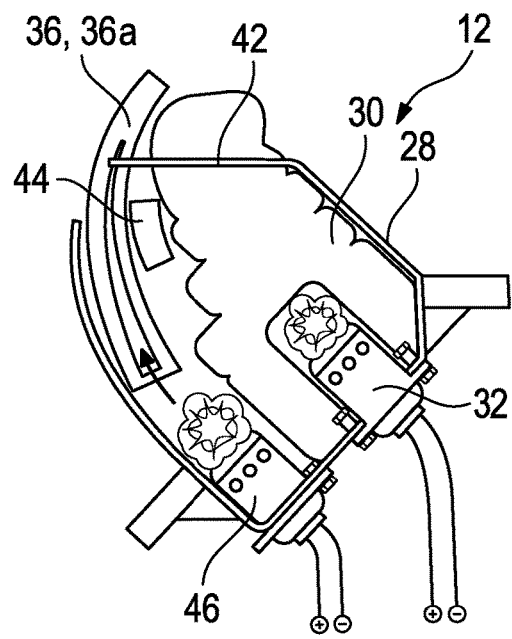
Fig. 4  Fig. 5
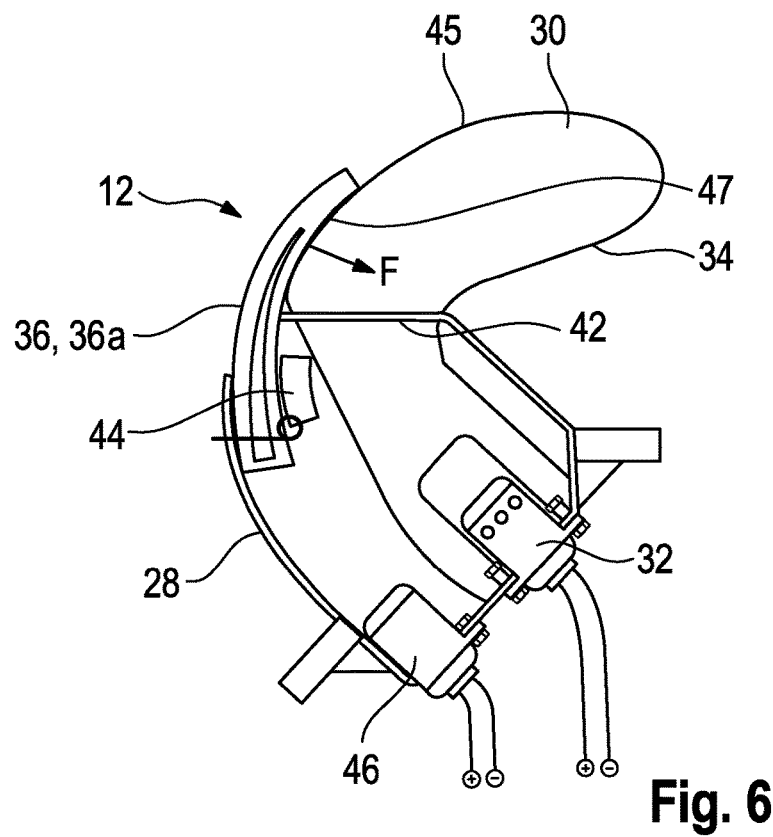
Fig. 6

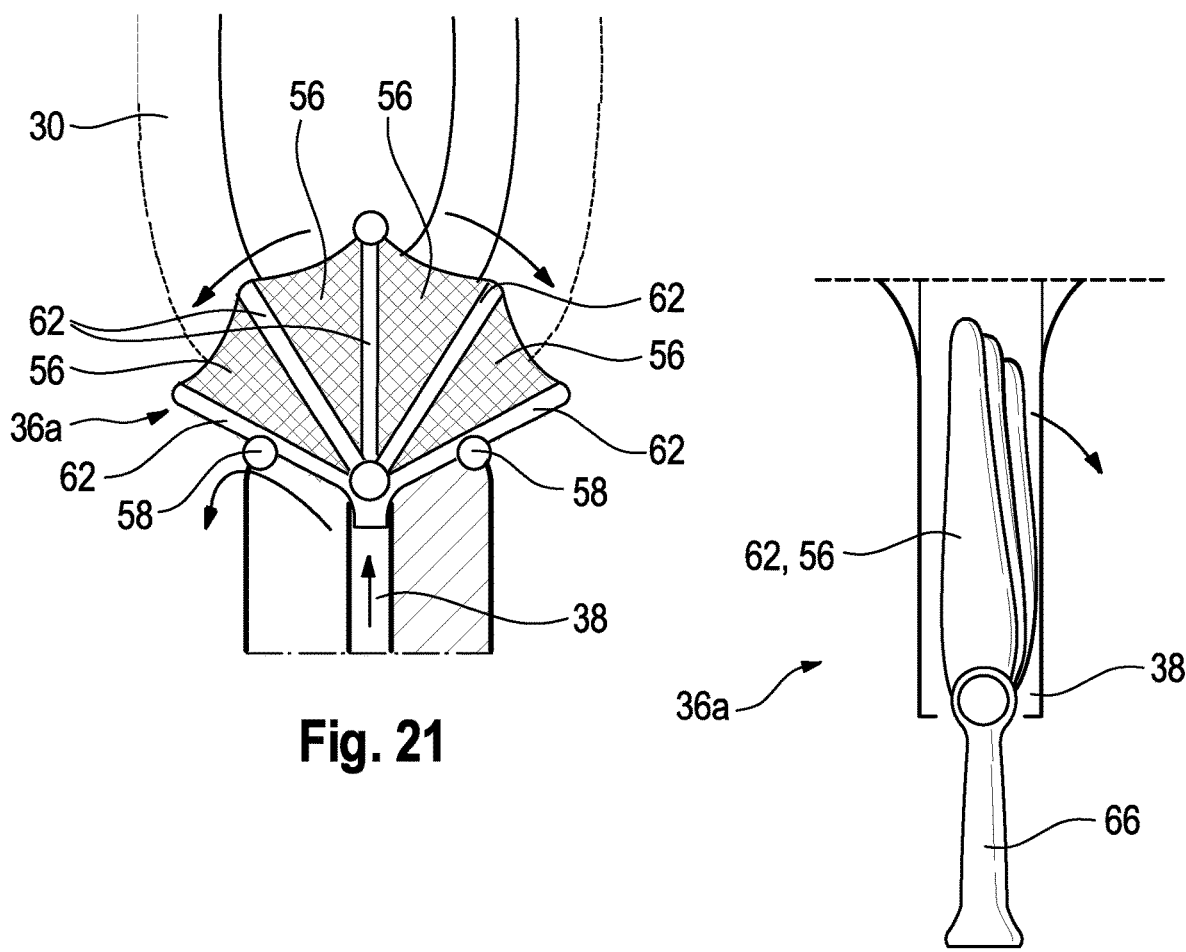
Fig. 21
Fig. 23
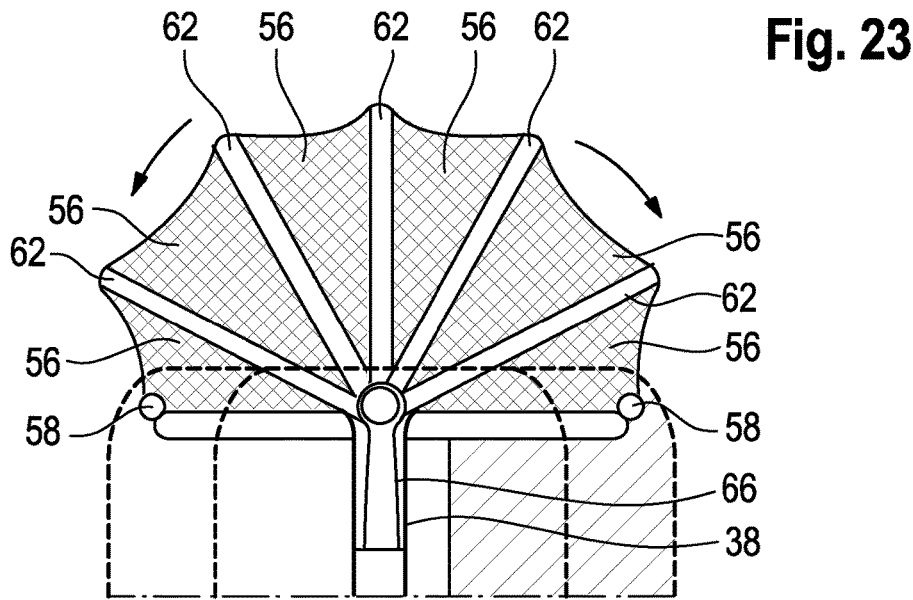
Fig. 22

AIRBAG MODULE, VEHICLE SEAT HAVING AN AIRBAG MODULE, AND VEHICLE

RELATED APPLICATIONS

This application is a U.S. National Stage Application filed under 35 USC 371, claiming priority to Serial No. PCT/EP2020/066419, filed on 15 Jun. 2020; which claims priority from German Patent Application DE 10 2019 116 586.5, filed 19 Jun. 2019, the entireties of which are hereby incorporated herein by reference.

TECHNICAL FIELD

The invention relates to an airbag module comprising a restraint airbag, to a vehicle seat comprising at least one airbag module of this type as well as to a vehicle comprising an airbag module of this type and/or a vehicle seat of this type.

BACKGROUND

Previously, reaction surfaces on components fixed to the vehicle frequently have been used to back up inflated airbags inside the vehicle interior and maintain them in their intended position.

In order to compensate for the missing of a reaction surface affixed to the vehicle in the region of the windows, U.S. Pat. No. 10,077,020 B2 suggests to make use of an additional reaction surface deployable in the vehicle door to cover a window opening in the vehicle in the case of restraint.

However, these known concepts can be applied basically only insofar as the airbag is ensured to deploy always in the same relation to the component affixed to the vehicle. This also means, however, that the vehicle occupant must adopt a fixed position inside the vehicle.

In particular regarding the concept of autonomous driving, in the meantime freer seating positions inside the vehicle interior have been desired. This also results in the necessity to protect a vehicle occupant not only in the classical upright and forward-directed seating position during situations of crash, but to offer proper protection even to positions in which the vehicle occupant adopts a rather reclined position, for example, or the vehicle seat is rotated relative to the driving direction.

SUMMARY

It is the object of the invention to improve the protection of a vehicle occupant and to allow for more flexible use of airbag modules.

This object is achieved by an airbag module comprising the features of claim 1. The airbag module according to the invention comprises a restraint airbag that is inflated in a situation of restraint and, in an inflated state, has a restraining effect on a vehicle occupant. In addition, the airbag module according to the invention includes at least one backup member which, in a restraining state, is at least in portions in contact with the inflated restraint airbag and which is configured to back the restraint airbag, wherein, in the inflated state, the restraint airbag is interposed between the backup member and the vehicle occupant. In an initial state, the backup member is arranged on or in the airbag module. The backup member may be accommodated inside the airbag module, for example, particularly in a module housing. In addition, the backup member may be configured as a member separate from the airbag module which is arranged on the airbag module when the airbag is mounted in the vehicle.

The airbag module can be used at any suitable position in the vehicle. By way of example only, arrangement of an airbag module of this type can be provided on or in a vehicle seat, in a steering wheel, an instrument panel, a vehicle door, a vehicle sidewall, a bottom, a roof rail or a roof surface of the vehicle. Also, arrangement is imaginable on a structure that can be positioned at different positions inside the vehicle, such as an additional seating element or a frame of a seating unit.

The at least one backup member is arranged particularly so that it absorbs a force applied to the restraint airbag by contact with a vehicle occupant.

In general, the backup member can be used to back the inflated restraint airbag and to stabilize the same in its position in the vehicle interior, when the vehicle occupant engages in the restraint airbag. Thus, the airbag module can also be used independently of reaction surfaces affixed to the vehicle, as the function thereof is taken over by the backup member. Preferably, the backup member extends on its side remote from the restraint airbag freely in the vehicle interior and, consequently, requires no reaction surface affixed to the vehicle.

The backup member is provided particularly at positions of the inflated restraint airbag at which the restraint airbag would back away due to its shape without the backup of a force applied by the vehicle occupant. The use of a backup member therefore allows for more freely choosing a variety of shapes for the restraint airbag.

The above object is further achieved by a vehicle seat comprising the features of claim 19. The vehicle seat includes at least one airbag module according to the invention which comprises a restraint airbag that is inflated in a situation of restraint and, in an inflated state, has a restraining effect on an occupant on a contact surface of the vehicle seat. At least one backup member is provided which, in a restraining state, is at least in portions in contact with the inflated restraint airbag and which can exert a force directed to the contact surface on the restraint airbag, the restraint airbag being interposed between the contact surface and the backup member.

Moreover, advantageous configurations of the airbag module according to the invention are illustrated in particular using the example of an airbag module arranged on or in the vehicle seat. This is not limiting and, hence, advantageous configurations of the airbag module of this type can be employed at any suitable position inside the vehicle.

The backup member of the airbag module takes over at least partially the function of a reaction surface affixed to the vehicle. Since the backup member is provided at the vehicle seat or even inside the airbag module itself, it is moved along with the vehicle seat when the latter is brought into a different position. Therefore, the reaction surface formed by the backup member is available independently of the position of the vehicle seat inside the vehicle.

The contact surface in this case forms the surface of the vehicle seat facing the vehicle occupant on which the occupant is seated or against which the occupant leans, i.e., the seat base, the surface of the backrest and the surface of the headrest.

The backup member should be arranged so that it imparts higher rigidity to the restraint airbag. In this way, in a situation of restraint it can exert a force directed to the occupant upon the restraint airbag, for example, when the occupant engages in the restraint airbag, so that the restraint airbag is maintained in its intended position, even if there is no reaction surface affixed to the vehicle, such as a sidewall of the vehicle interior, adjacent to the restraint airbag.

It has turned out that, in many cases, it is sufficient to back the restraint airbag via a relatively small surface only, if this is done at a position where the restraint airbag, for example due to its shape, tends to yield to an application of force. Such position is located at the exit opening of the airbag out of the module housing of the airbag module, for example.

Thus, by using one or more backup members, one or more restraint airbags, for example, can be arranged on the vehicle seat itself, thus basically allowing complete protection of the vehicle occupant to be achieved at any seat positions. On the one hand, the backup member(s) provide sufficient lateral back-up to the restraint airbag to restrain the occupant in the vehicle seat. On the other hand, preferably the backup member(s) may also be used to move the restraint airbag to a desired position relative to the occupant, such as located in curved shape above the occupant. For this purpose, at least portions of the backup member can also extend in curved shape, for example.

Preferably, the backup member is located outboard of the restraint airbag and is a component separate from the restraint airbag.

As a rule, the restraint airbag is larger, longer and wider than the backup member.

The backup member may be selected to have any shape and design as well as any material.

The fabrication and the assembly can be facilitated when the backup member is integrated in the airbag module which also accommodates the folded restraint airbag in the initial state, i.e., in the normal operating state of the vehicle. It is also possible, of course, to provide such airbag module at positions in the vehicle other than on a vehicle seat.

In the restraining state, the backup member preferably extends from the airbag module arranged on the vehicle seat, for example, along a rear side of the inflated restraint airbag into the vehicle interior.

Generally preferred, the backup member is located, in the restraining state, in the area of an exit opening of the restraint airbag out of the airbag module so that the backup member can back the restraint airbag specifically at the positions where the restraint airbag due to its shape needs to be particularly backed to absorb the forces acting when the occupant engages in the airbag without its position in space being changed.

The at least one backup member is preferably arranged, in an initial state, during normal operation of the vehicle in a holder on the vehicle seat, in particular in the airbag module. Moreover, a transfer mechanism can be provided which in a situation of restraint moves the at least one backup member out of the holder into its restraining state.

The transfer mechanism may be designed in any suitable manner, adapted to the type of the respective backup member, of course. Basically, a mechanically driven transfer mechanism can be used just as a transfer mechanism operated by gas pressure to which highly pressurized gas is supplied from a gas generator, for example.

If the transfer mechanism comprises a mechanical drive, the energy for moving the backup member can be obtained from spring tension or via an electrically driven motor. In order to utilize the mechanical output for moving the backup member, a suitable gear unit, a worm gear or a spindle drive is provided, for example.

If the transfer mechanism comprises a gas generator, this can be a gas generator separate from the gas generator of the restraint airbag. However, it is also possible to branch off part of the gas flow generated by the gas generator of the restraint airbag in order to actuate the transfer mechanism. The backup member can be moved from its initial state to its restraining state by means of a piston displaced by gas pressure or by a toothed rack, for example.

In a very simple possible embodiment, the transfer mechanism is formed by the backup member being firmly fixed to an outer wall of the restraint airbag so that the inflating restraint airbag automatically also draws the backup member out of the holder into its restraining state.

It is useful in many cases to provide, in the module housing or, if necessary, on the vehicle seat in the area of the holder, a guide for the backup member that predefines or supports the movement of the backup member from the initial state to the restraining state.

In general, the time at which the backup member is moved from an initial state to the restraining state can be freely selected. Said time may be before, simultaneously with or after the time of the start of inflation of the restraint airbag.

According to a preferred embodiment, at least one backup member is provided being a dimensionally stable backup member which, in the restraining state, is at least in portions a rigid component. The dimensionally stable member should be designed to have inherent rigidity so that it can still have a backup effect on the restraint airbag when the occupant engages in the latter.

It is possible to design the dimensionally stable backup member as a rigid body that is transferred from the initial state to the restraining state without any change of shape. In this case, the dimensionally stable backup member may be plate-shaped or rod-shaped, for example.

The dimensionally stable backup member may also be designed so that it partially changes its shape between the initial state and the restraining state, for example to take a shape that is curved more inwardly toward the contact surface. It is an option to equip the outboard side of the dimensionally stable backup member with meshing structures or locking connections which, when being in mesh, increase the rigidity of the dimensionally stable backup member in the restraining state. In the initial state, the then more flexible dimensionally stable backup member can be accommodated more easily in its holder.

The skilled person is free to select the material for the dimensionally stable backup member. For example, dimensionally stable backup members made of plastics are suitable, but also rigid foam materials or plastic films folded into particular shapes or coated paper layers may be used.

In particular, it is conceivable for the dimensionally stable backup member to be made of an auxetic material at least in portions. An auxetic material is a material which expands when it is stretched transversely to the stretching direction and, in doing so, to which higher stability is imparted especially transversely to the stretching direction. This property results from a honeycomb or netting structure in which the individual cells have specific shapes. This can be achieved by a specific folding technique, for example.

A dimensionally stable backup member of auxetic material can be used, for example, such that the dimensionally stable backup member is fastened to the restraint airbag and, along with the latter, is pulled out of its holder, wherein a thickness of the dimensionally stable backup member increases perpendicularly to the pull direction by the pulling force, which results in a stiffening effect.

The dimensionally stable backup member may be moved from its initial state to its restraining state in any way, for example by linear displacement, by swiveling, unfolding or rotating.

Advantageously, a stop is provided on the vehicle seat or on the airbag module, the stop limiting the movement of the dimensionally stable backup member when the latter has reached its restraining state.

It is another option to design the dimensionally stable backup member so that it rolls up when it exits the holder. The pretension required to this end preferably results from the structure of the dimensionally stable backup member, e.g., a specific folding of a thin flat material or an inherent pretension, analogously to the known snap bracelets.

In another preferred embodiment, the dimensionally stable backup member comprises a flexible portion which, in the initial state, is arranged folded in the holder and which unfolds when it is transferred to the restraining state. In this way, a backup member having a large reaction surface can be provided for the restraint airbag, without an appropriately large space having to be made available in the holder on the vehicle seat.

Advantageously, the flexible portion is firmly fixed to both the dimensionally stable backup member and the vehicle seat, in particular in the area of the edge of the exit opening of the restraint airbag and preferably at several points spaced apart from each other.

The flexible portion is formed, for example, by a textile, film or netting material that is spanned between rigid struts, similarly to an umbrella or a fan. In this way, the surface of the backup member can be increased perpendicularly to a moving direction out of the holder, for example.

In another possible configuration, the dimensionally stable backup member has a rigid T-shaped strut that spans a flexible portion between the T-shaped free end of the backup member and the edge of the exit opening.

In another embodiment, the flexible portion of the dimensionally stable backup member is provided with a curable material that cures when the dimensionally stable backup member is transferred to the restraining state by the exposure to light and/or to a suitable chemical. For this purpose, e.g., quickly curing epoxy resins whose curing time of about 30 ms is within the range of the inflation time of the restraint airbag are on the market. If UV light is required for curing, UV LEDs might be integrated in the backup member, wherein power can be supplied through the terminal of the gas generator of the restraint airbag.

It would also be imaginable to provide the flexible portion with an electro-rheological or magneto-rheological liquid that solidifies in the restraining state when an electric or magnetic field is applied so that the flexible portion is stiffened in the restraining state as compared to the initial state.

Another option for forming a dimensionally stable backup member is to provide a portion of the outer cover of the restraint airbag or an additional layer on the restraint airbag, such as in the area of the exit opening, with such curable or solidifying material.

It is basically possible to provide, in addition or as an alternative to the afore-described backup members, tethers at a suitable position on the restraint airbag and on the vehicle seat, said tethers urging the inflated restraint airbag toward the contact area and, thus, toward the occupant. In particular, the tethers could be provided with a curable or solidifying material.

On principle, it is possible in each backup member to additionally provide such curable or solidifying material.

In accordance with yet another embodiment, the dimensionally stable backup member comprises plural rigid interconnected sub-elements which in the initial state are adjacent to each other in a compact manner and, in the restraining state, are pulled apart to have a larger length than in the initial state. The individual sub-elements can be telescoped, for example, or else arranged as scales linearly movable against each other, wherein a stop should be provided in each case to define a defined end position in the restraining state. It would also be conceivable in this context to make use of an auxetic material.

The individual sub-elements may be provided with locking elements that engage with each other in the restraining state so as to additionally stiffen the dimensionally stable backup member.

According to yet another preferred embodiment, the backup member is firmly connected to the vehicle seat and does not vary its position and shape between the initial state and the restraining state. For example, the backup member it firmly integrated in the seat frame and can also determine the shape of a seat bolster, backrest or headrest. In this case, the backup member preferably has an inner surface inwardly curved toward the contact area of the vehicle seat against which the restraint airbag abuts with its portion directly connected to the exit opening.

Another variant provides to design the backup member as a backup airbag whose volume is larger in the restraining state than in the initial state. In the initial state, the backup airbag is arranged, e.g., in a folded state in the airbag module. When the backup airbag is transferred to the restraining state, it is filled and deploys out of the airbag module into a position in which it forms a reaction surface for the restraint airbag.

According to a further preferred embodiment, at least one backup member is provided which is an inflatable backup airbag. Said backup airbag in the restraining state extends outboard of and laterally backs the restraint airbag so that the restraint airbag is always located between the occupant and the backup airbag. The backup airbag is not intended to directly contact the vehicle occupant and to develop a direct restraining effect.

Usually, the backup airbag has a significantly smaller volume than the restraint airbag and mostly is also shorter and narrower than the restraint airbag.

As to its dimensions, the backup airbag can approximately correspond to one of the afore-described dimensionally stable backup members. Just as the latter, also the backup airbag is advantageously placed in the area of the exit opening of the restraint airbag out of the airbag module so as to protect the portion of the restraint airbag adjacent to the exit opening against a laterally outboard movement and also, where necessary, to press the restraint airbag toward the occupant, viz. toward the contact area.

As a rule, the backup airbag is an airbag completely separate from the restraint airbag. However, both airbags may be accommodated in the same airbag module, in particular in the same module housing. It is possible to fill the backup airbag also via the gas generator of the restraint airbag, but there may also be provided a separate gas generator to the backup airbag.

It is possible to fill the backup airbag at a higher internal pressure than the restraint airbag, in particular at about 1.5 bars. The increased internal pressure should be maintained over the entire service life of the backup airbag to improve the backing effect.

The backup airbag may be a conventionally known airbag consisting merely of an outer cover that is filled with filling gas from a gas generator. It would also be conceivable, however, to provide, inside the backup airbag, a structure flexible in the initial state which unfolds and stiffens during inflation, being supported by appropriate chemicals and/or exposure to light, where necessary. It would also be imaginable to fill the backup airbag with an appropriate curing foam to increase the rigidity thereof in the restraining state.

Where appropriate, the backup airbag can bear against a rigid component affixed to the vehicle, such as a wall of the interior. Preferably, the backup airbag itself constitutes, without any further backing, a sufficiently rigid reaction surface to the restraint airbag.

In another possible embodiment, the backup airbag is formed by an inflatable extension at the restraint airbag which extends along the vehicle seat against the actual deployment direction and which is adjacent to the vehicle seat. The backing effect in this case results from leverage.

There may also be provided plural backup airbags which mutually back each other to provide a sufficiently stiff reaction surface to the restraint airbag. Accordingly, the backup airbags can be juxtaposed in series, for example, so that between the laterally outermost backup airbag and the restraint airbag there are located plural backup airbags all of which are in contact with their respective neighbors.

In another preferred embodiment, the at least one backup member is in the form of a backup chamber forming an inflatable portion of the restraint airbag. Such restraint airbag includes at least two chambers: The restraint airbag comprises at least one restraint chamber in addition to at least one backup chamber. The backup chamber of such restraint airbag is filled, in the filled and deployed state of the restraint airbag, at a higher internal pressure than the restraint chamber.

The backup chamber and the restraint chamber can be filled with gas by the same gas generator that may include, e.g., two gas outlets for this purpose so that in the backup chamber which, in typical embodiments, has a smaller volume than the restraint chamber the higher internal pressure can be reached.

As an alternative, a partition separating the backup chamber from the restraint chamber in the restraint airbag can comprise overflow openings. Those overflow openings can be designed to be especially closable, wherein the overflow openings can be closed in response to the internal pressure of the backup chamber or the restraint chamber, for example. In addition, it may be provided that the closing of the overflow openings takes place in response to the deployment of the restraint airbag, in particular of the restraint chamber or the backup chamber. In such embodiment, for example a closing member for the overflow opening can be connected via a tether to the cover of the restraint airbag, for example in the area of the restraint chamber, so that, when the restraint airbag is deployed in a particular manner, the closing member is drawn onto the overflow opening and closes the same, and solely the backup chamber is further filled, thereby the higher internal pressure adjusting in the backup chamber.

In another preferred embodiment, at least one backup member including a structure of at least two leg elements at least portions of which are disposed substantially V-shaped relative to each other and of at least one cross strut which connects the leg elements is provided. The leg elements reproduce a principle known from other technical fields that is referred to as fin ray effect. In particular in industrial robotics, gripper elements are tested which automatically adapt to the contour of the object to be gripped and make use of the fin ray effect to achieve said adaptability.

The basic technical principle is borrowed from the bone structure of fish fins which do not back away, when a force is applied to a spot, in the direction of the force, but the tip thereof astonishingly moves in the direction opposite to the direction of the force effect. The point force application thus causes such fish fin to curve in the opposite direction. The invention transfers this principle to the backup member. The force acting through the restraint airbag upon the backup member accordingly results in the backup member curving toward and exerting a backing force upon the restraint airbag, whereby the backing away of the restraint airbag can be prevented or at least sufficiently reduced due to the load applied by the vehicle occupant.

Preferably, in such backup member plural cross struts are disposed between the leg elements. The cross struts are disposed, in cross-section of the backup member, particularly rung-like between the leg elements, wherein the length of the cross struts is reduced toward the joint tip of the leg element.

The cross struts may be arranged in parallel to each other in the backup member. Alternatively, the cross struts may be angled with each other, wherein the spaces between the cross struts along a rear leg element are larger than along a front leg element that abuts on the restraint airbag in the contact region.

The technical solution of the backup member is based on the fact that, as a base member, an acute triangle formed of resiliently formed leg elements is kept at a distance by cross struts articulated to the two leg elements, thereby a structure resembling the twin-ray base member of the bone fish fin being formed.

The leg elements and/or the cross struts may be inflatable elements. Alternatively, the leg elements may be resiliently flexible elements and the cross struts may be substantially dimensionally stable elements. Moreover, such backup member may be provided to be formed of a combination of inflatable resiliently flexible and substantially dimensionally stable elements. For example, the leg elements may be provided to be formed of inflatable elements and the cross struts of dimensionally stable elements or the leg elements of resiliently flexible elements and the cross struts of inflatable elements. In particular, it may also be provided that a leg element is formed of each of an inflatable and a resiliently flexible element and/or the cross struts are formed of both inflatable elements and dimensionally stable elements.

For example, the leg elements and/or the cross struts can be fabricated, if they are in the form of inflatable chambers, of the same fabric as the restraint airbag. Alternatively, each suitable inflatable material that is obvious to those skilled in the art can be used. Furthermore, the leg elements and/or the cross struts can be made, for example, of suitable plastics, such as polyurethanes. In such embodiment, the leg elements and the cross struts are preferably connected to each other so that in the initial state the backup member can be stored in a compact manner and unfolds to its final shape only when the airbag module has been activated.

As a matter of course, it is equally possible to combine different types of backup members. In particular, it may be of advantage to provide at least one backup member in the form of a dimensionally stable backup member as well as at least one backup member in the form of a backup airbag or at least one backup member in the form of a dimensionally stable backup member as well as at least one backup member in the form of a backup chamber. Advantageously, in the restraining state the backup airbag or, resp., the backup chamber is located between the restraint airbag or, resp., the restraint chamber and the dimensionally stable backup member so that the dimensionally stable backup member backs the backup airbag or, resp., the backup chamber laterally outboard and can apply a counterforce to the restraint airbag when the occupant engages in the latter.

The backup airbag or, resp., the backup chamber and the dimensionally stable backup member may have complementary outer contours so that in the restraining state a form fit which additionally increases the rigidity is resulting between the two backup members.

The two backup members can be transferred to their restraining state simultaneously or time-shifted, wherein the times in turn can be selected simultaneously with or time-shifted with respect to the start of inflation of the restraint airbag.

The dimensionally stable backup member may be fastened to the backup airbag or the backup chamber of the restraint airbag, for example, so that it is pulled from its initial state to its restraining state when the backup airbag is inflated. It is also imaginable to use the backup airbag to slide or swivel the dimensionally stable backup member to its restraining state.

In general, all features described so far for the individual types of backup members can be freely permuted against each other or combined with each other at will even in a combination of a dimensionally stable backup member and a backup airbag and/or a restraint airbag with a backup chamber. In particular, the backup member may have any design. For example, one of the afore-described backup members or any combination of plural afore-described backup members can be used. In particular, an afore-described transfer mechanism can also be provided in the airbag module.

Especially when the vehicle seat is designed so that it is rotatable relative to the driving direction, or when the occupant is provided, for example, to recline the backrest to a reclined position even during driving, the protective effect for the occupant can be improved by at least two airbag modules being provided on the same vehicle seat which are arranged on each side of the contact area. The airbag modules may be arranged on the seat base, the backrest or the headrest so that specifically the legs/hips, the torso and the head of the vehicle occupant can be protected by airbags.

Accordingly, it is possible to provide airbag modules only on one side of the vehicle seat, i.e., the contact area, or else on both sides of the vehicle seat.

In an example embodiment, on each side of the vehicle seat three airbag modules are positioned, for example, in the area of the headrest, the backrest and the seat base. In the event of a situation of restraint, the vehicle occupant in this case can be enclosed virtually completely by airbags upwards from the upper legs.

In another example embodiment, e.g., only two airbag modules may be provided on the vehicle seat which are optionally disposed on the headrest, the backrest or the seat base, wherein both airbag modules may be disposed on one side of the seat or the two airbag modules are mounted on opposite sides of the seat.

When at one position (seat base, backrest or headrest) airbag modules are provided on opposite sides of the contact area, preferably each of the restraint airbags extends to the center of the contact area. When only one airbag module is provided at one of said positions, the restraint airbag may extend over the entire width of the contact area.

It is possible, as a matter of course, to use different types of backup members or combinations of backup members for different positions as well as on the different sides of the contact area.

When two restraint airbags which contact each other in the inflated state are provided on opposite sides of the contact area, each of the restraint airbags may include a fixing structure, wherein the restraint airbags are fixed to each other in the inflated state when the fixing structures interact.

The interacting fixing structures may be magnets, Velcro® fasteners as well as a complementary shaping of the outer surface of the two restraint airbags.

Moreover, the invention relates to a vehicle, in particular comprising at least one afore-described airbag module and/or at least one afore-described vehicle seat. In such vehicle, the vehicle seat may be fastened to the bottom of the vehicle interior in an especially displaceable, tiltable or pivotable manner.

All features of the individual embodiments can be realized basically at the discretion of those skilled in the art also in any other combinations or each per se.

BRIEF DESCRIPTION OF THE DRAWINGS

In the following, the invention will be described in detail by means of plural embodiments with reference to the attached drawings, wherein:

FIGS. 4 to 6 show an airbag module according to the invention as set forth in a second embodiment in different states before and during activation thereof;

FIGS. 13 to 48 show vehicle seats according to the invention as set forth in further embodiments comprising different dimensionally stable backup members in different representations;

DESCRIPTION

Figure 1:
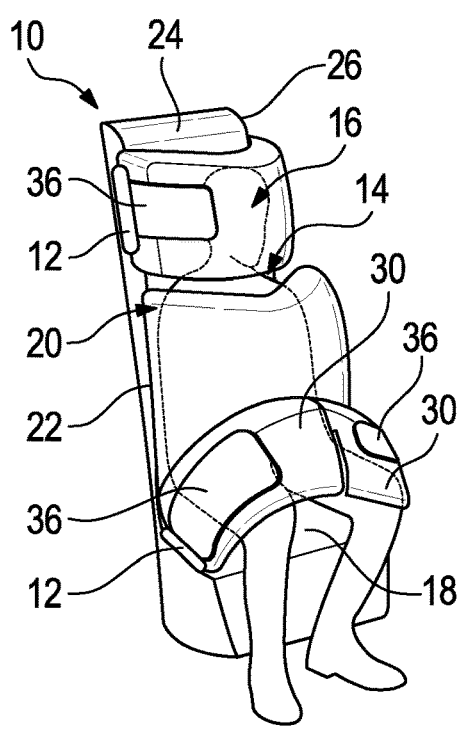
FIG. 1 shows a vehicle seat according to the invention as set forth in a first embodiment.

FIG. 1 shows a vehicle seat 10 comprising one or more airbag module(s) 12 integrated in the vehicle seat 10 as set forth in a first embodiment. In the interior of a vehicle (not shown) several vehicle seats 10 may be arranged.

The airbag module 12 may be mounted at different points on the vehicle seat 10 as will be also discussed in the following with reference to FIGS. 7 to 12.

The vehicle seat 10 has a contact area 14 which a vehicle occupant 16 contacts when he/she is seated in the vehicle seat 10. The contact area 14 is composed of a seat base 18, the area 20 of a backrest 22 and the area 24 of a headrest 26 (see also FIG. 7).

The airbag module(s) 12 is/are arranged on the side of the contact area 14 and is/are positioned in the area of the seat base 18, the backrest 22 or the headrest 26.

Figure 2:
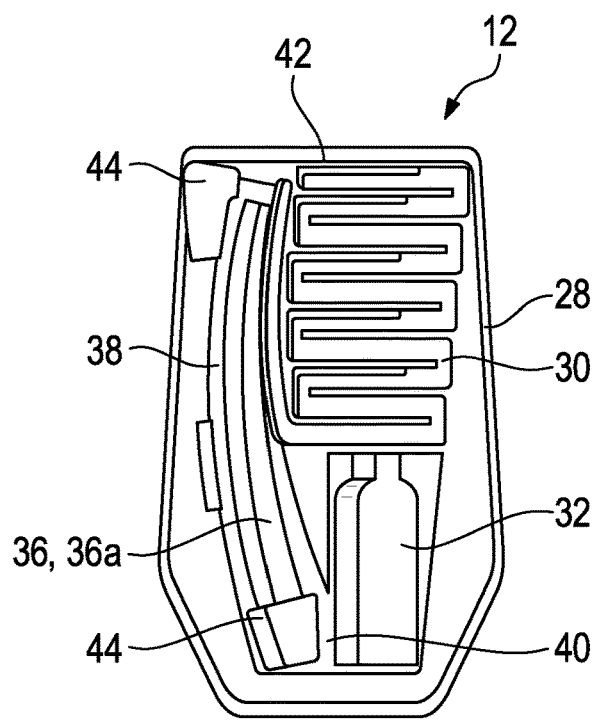
FIG. 2 shows an airbag module according to the invention as set forth in a first embodiment, with the backup member being illustrated in the initial state.
Figure 3:
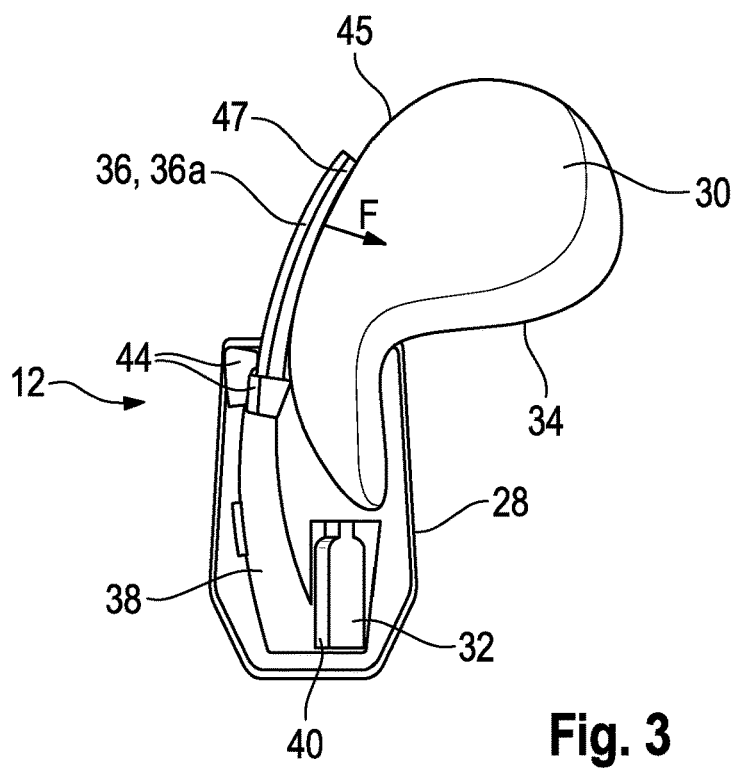
FIG. 3 shows the airbag module of FIG. 2, with the backup member being illustrated in the restraining state.

In FIGS. 2 and 3, the airbag module 12 according to a first embodiment is shown. The airbag module 12 in this case is arranged in the vehicle seat 12 in a holder not shown in detail, but it could also be provided, independently of a vehicle seat, at any other suitable position in the vehicle. This applies to all variants described in this application (see especially also FIG. 52a).

The airbag module 12 comprises a module housing 28 in which a folded restraint airbag 30 and a gas generator 32 are accommodated, the gas generator 32 supplying filling gas for inflating the restraint airbag 30.

The restraint airbag 30 serves for cushioning the occupant 16 in a situation of restraint, and to this end has an inner face 34 directed to the occupant 16 (see e.g., FIG. 3) that comes directly into contact with the occupant 16.

The airbag module 12 further comprises at least one backup member 36.

In a normal operating condition, the backup member 36 may be disposed in an initial state in a holder 38 inside the module housing 28 so that it is not visible from an outside of the vehicle seat 10.

A transfer mechanism 40 realized in this case by a gas supply via the gas generator 32 helps move the backup member 36 out of the holder 38 so that it extends out of the module housing 28 through an exit opening 42 for the restraint airbag 30.

The transfer mechanism 40 could also be realized by a mechanical drive, e.g., using spring force or an electric motor.

FIGS. 1 and 3 illustrate the vehicle seat 10 and the airbag module 12 in a situation of restraint, while FIG. 2 shows the airbag module 12 in the initial state during normal driving before the restraint airbag 30 is inflated.

During normal driving, the backup member 36 is in its initial state inside the module housing 28, whereas in the situation of restraint it adopts a restraining state in which it has exited the module housing 28.

In the restraining state, the inflated restraint airbag 30 rests with its rear side 45 on an inner face 47 of the backup member 36 facing the contact area 14. Thus, the backup member 36 backs the restraint airbag 30 against an outward movement away from the contact area 14. In this example, the loads produced by the engagement of the occupant 16 are transferred to the vehicle seat 10, more exactly to a rigid seat frame. In so doing, the backup member 36 exerts a force F acting toward the contact area 14 upon the restraint airbag 30, said force F being formed as a counterforce to the load caused by the occupant 16.

The side of the backup member 36 remote from the vehicle occupant 16 is usually located freely in the vehicle interior and, thus, does not bear against a component affixed to the vehicle.

In general, the restraint airbag 30 in the restraining state is always located between the occupant 16 and the backup member 36 so that the backup member 36 is not in direct contact with the occupant 16.

When the airbag module 12 is disposed, as shown, on a vehicle seat 10, the backup member 36 extends primarily in the area of the exit opening 42 from the vehicle seat 10 along the rear side 45 of the restraint airbag 30. The backup member 36 is both narrower and shorter than the restraint airbag 30, as is also evident from FIGS. 7 to 12.

In this embodiment, the backup member 36 is in the form of a dimensionally stable backup member and, therefore, will be denoted hereinafter with the reference symbol 36a. The dimensionally stable backup member 36a is at least in portions a rigid component.

A stop 44 on the module-side end of the backup member 36a and on the exit opening-side end of the module housing 28 prevents the backup member 36a from being displaced beyond the restraining state.

When the dimensionally stable backup member 36a is transferred from its initial state to its restraining state, in the example it is slid, in its entirety, linearly along the holder 38 out of the exit opening 42 by the gas pressure. The walls of the holder 38 act as a guide and predefine an exit direction.

In FIGS. 4 to 6, a variant of the just described embodiment is shown. In this case, an additional gas generator 46 used to move the backup member 36 is provided in the airbag module 12. In this event, the gas generator 32 serves exclusively for inflating the restraint airbag 30. Instead of a second gas generator 46, also a two-stage gas generator in which one stage is associated with the restraint airbag 30 and the other stage is associated with the backup member 36 (not shown) can be used.

FIG. 4 illustrates the airbag module 12 in the initial state during normal driving. FIG. 5 illustrates the airbag module 12 during activation, while FIG. 6 shows the airbag module 12 after activation, both of the restraint airbag 30 and the backup member 36 being in the restraining state.

The additional gas generator 46 can be triggered simultaneously with the gas generator 32, but also time-shifted and few milliseconds before or after the gas generator 32 is activated.

Figure 7:
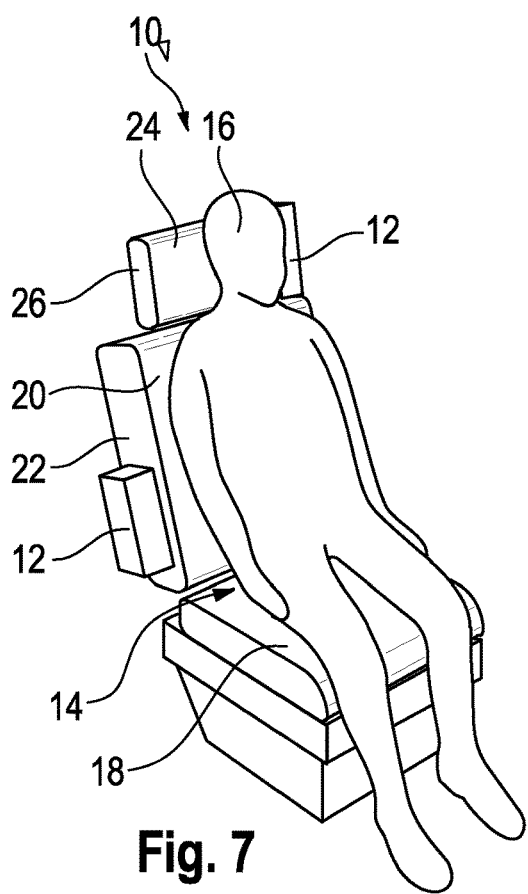
FIGS. 7 to 12 shows vehicle seats according to the invention as set forth in further embodiments in each of a normal operating situation and a situation of restraint.
Figure 8:
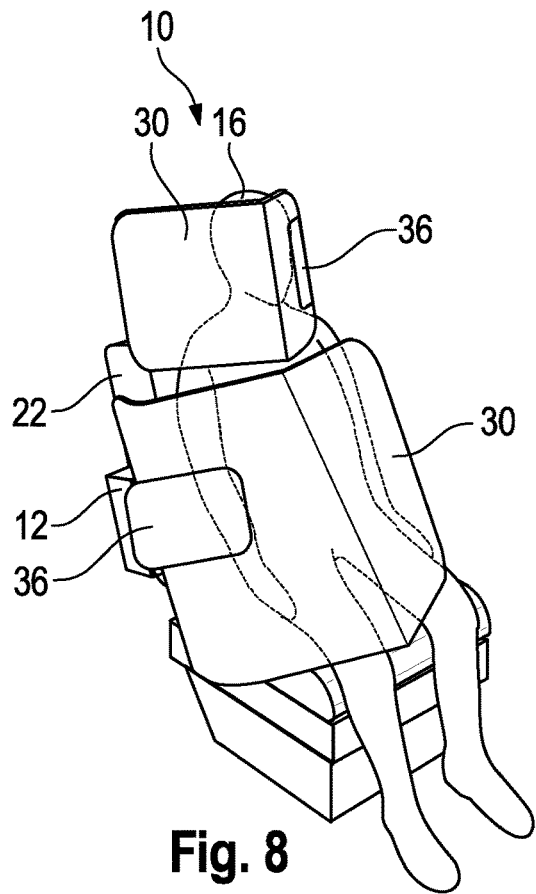
Figure 9:
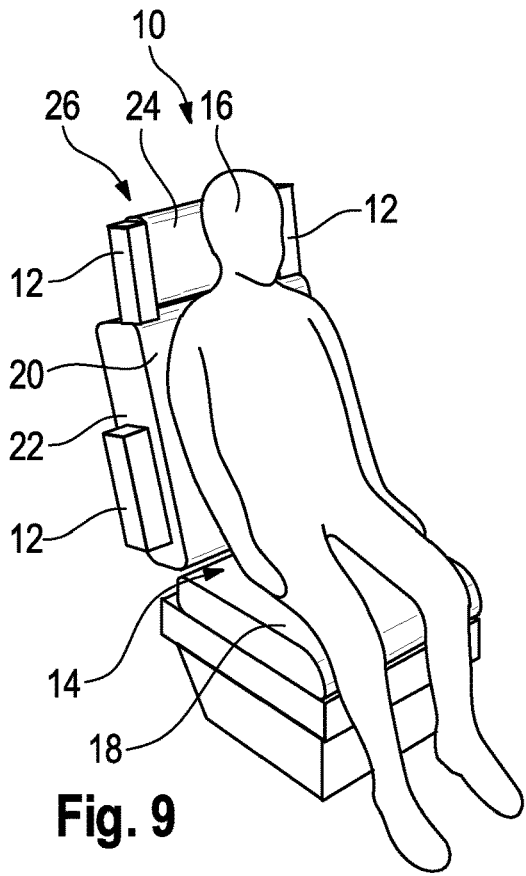
Figure 10:
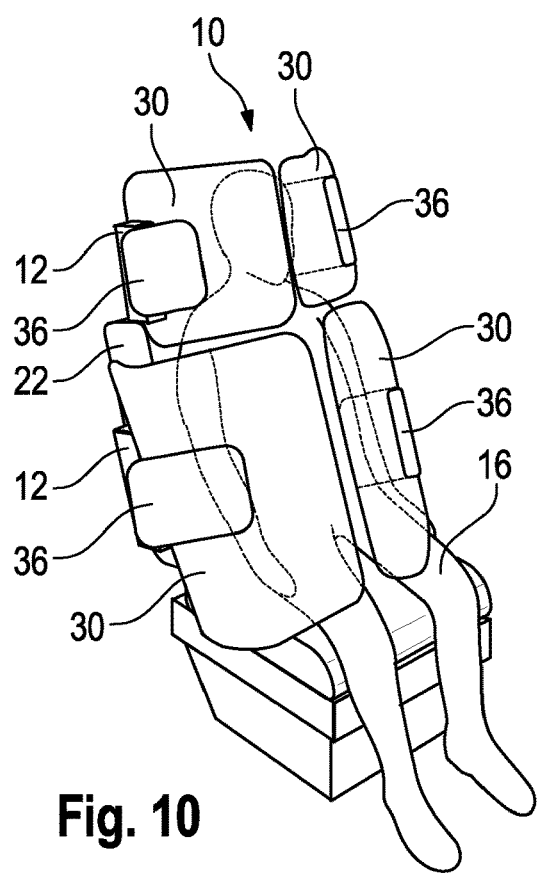
Figure 11:
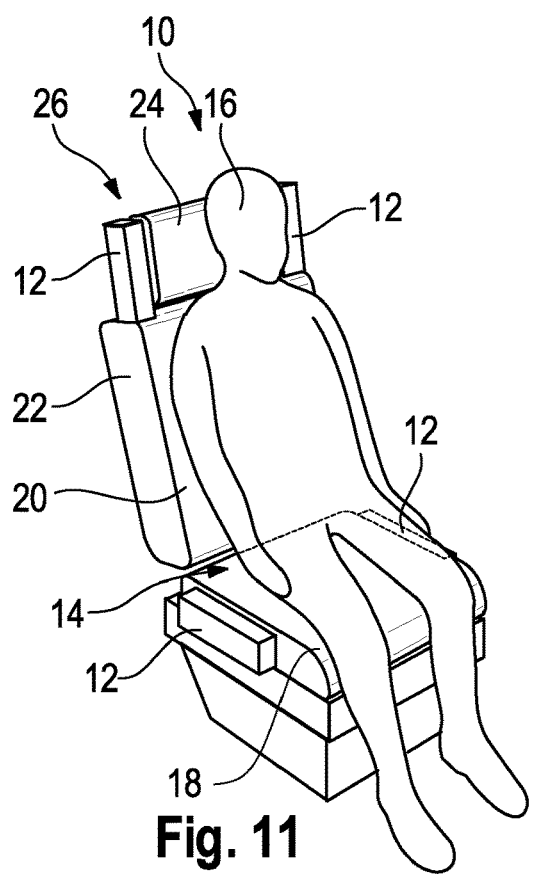
Figure 12:
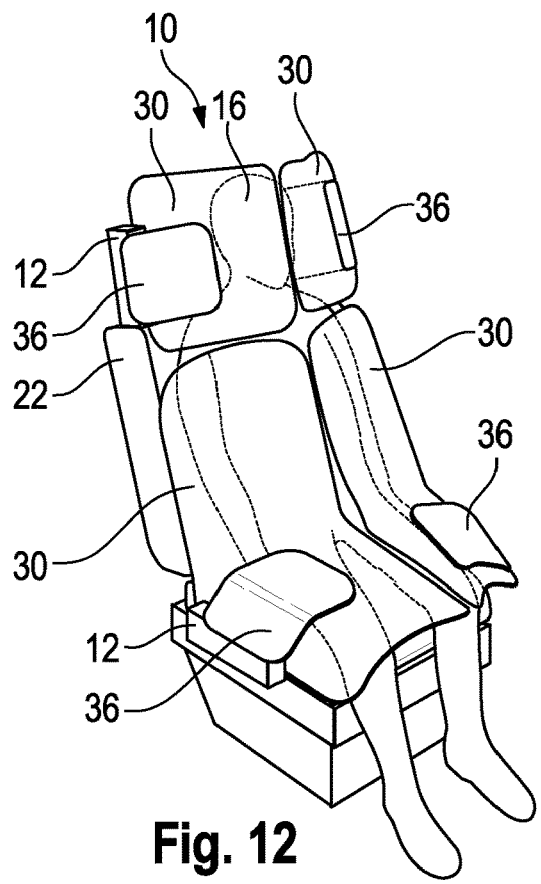

FIGS. 7 to 12 show different options of arranging plural airbag modules 12 on a vehicle seat 10. FIGS. 7, 9 and 11 show each of the airbag modules 12 before activation, wherein the respective restraint airbags 30 and backup members 36 are in their initial states, while FIGS. 8, 10 and 12 illustrate the airbag modules 12 in the activated state, wherein the respective restraint airbags 30 and backup members 36 are in the restraining state.

In the variant shown in FIGS. 7 and 8, on each of both sides of the seat 10, more precisely the contact area 14, an airbag module 12 is disposed. One of the airbag modules 12 is located at the backrest 22, while the second airbag module 12 is provided on the opposite side at the headrest 26.

Hence, the two restraint airbags 30 wrap around the vehicle occupant 16 from opposite sides. In this example, each of the two restraint airbags 30 is shaped transversely to the contact area 14 so that it extends in a curve substantially to the opposite side of the contact area 14 (see FIG. 8).

The two backup members 36, on the other hand, are significantly shorter and do not reach to an imaginary centerline of the contact area 14 or the seat 10.

In the variant shown in FIGS. 9 and 10, a total of four airbag modules 12 are arranged on the vehicle seat 10 each of which is provided on both sides of the headrest 26 and of the backrest 22.

As FIG. 10 illustrates, here the restraint airbags 30 are selected to be shorter transversely to the contact area 14 and only reach to about the center of the contact area 14. The individual restraint airbags 30 are substantially mirror-symmetrical to the centerline of the seat 10 so that the occupant 16 is encompassed from both sides by the restraint airbags 30.

FIGS. 11 and 12 show a variant in which, as in the latter example, a total of four airbag modules 12 are provided which are disposed on both sides of the headrest 26 and on both sides of the seat base 18.

In the two latter examples, the restraint airbags 30 of the airbag modules 12 are configured on the seat base 18 or the backrest 22 along the vertical direction of the vehicle seat 10 to have such a length that they offer protection to both the upper legs and the torso of the vehicle occupant 16.

In FIGS. 13 to 16, a possible variant of a dimensionally stable backup member 36*a* is shown.

The dimensionally stable backup member 36*a* is made from a plastic material or stable foam, for example, and has plural incisions 48 along its inner face 47 so that the entire dimensionally stable backup member 36*a* can be formed into an arc so that the inner face 47 takes a concavely curved shape.

On an outer face 50 opposite to the inner face 47, plural pairs of meshing structures 52 that are formed by specifically shaped incisions along the outer face 50 are provided along the longitudinal extension of the dimensionally stable backup member 36*a*.

Figure 14:
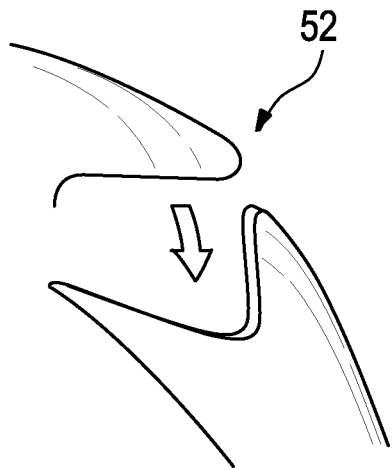
Figure 15:
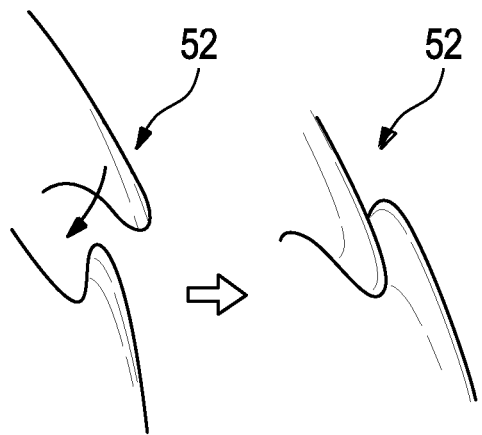
Figure 16:
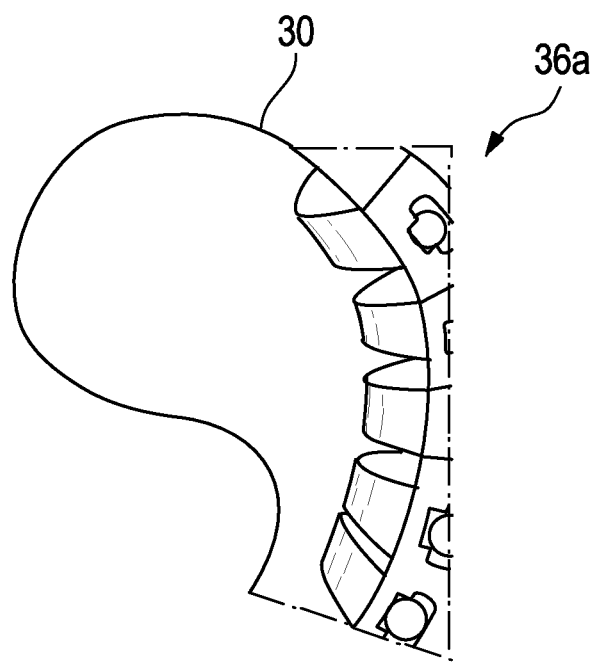

In the initial state, the respective meshing structures 52 of one pair are still spaced apart from each other (see FIG. 14 and FIG. 15 on the left).

When the dimensionally stable backup member 36*a* is shifted from the initial state to its restraining state (see arrow direction P in FIG. 13), it is formed into a curved shape by the guide in the holder 38, for example.

Figure 13:
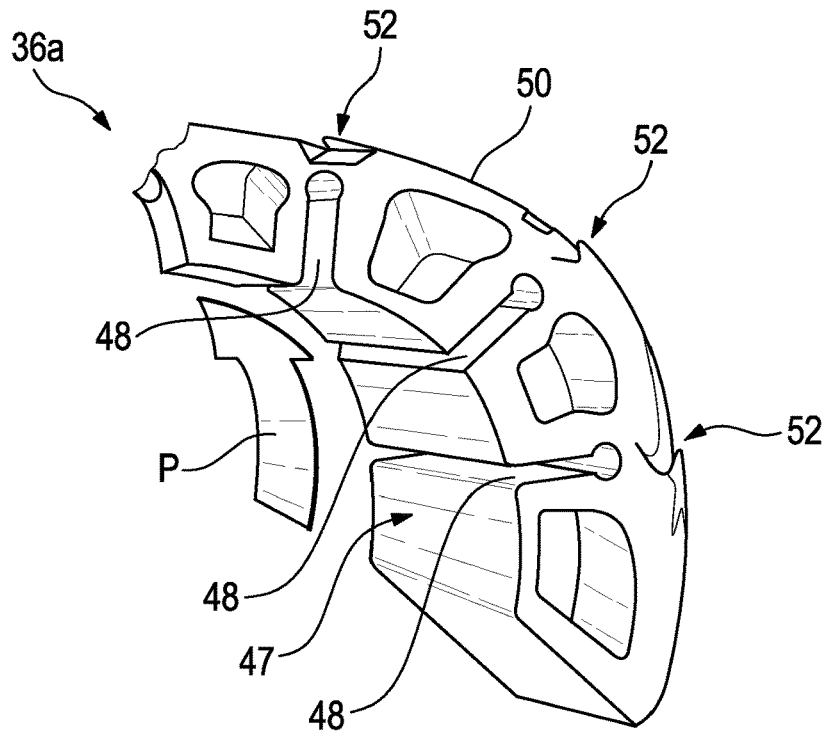

The individual meshing structures 52 of each pair mesh and interlock with each other so that the dimensionally stable backup member 36*a* maintains its curved shape in the restraining state (see FIGS. 13 and 15 on the right).

FIGS. 17 to 20 illustrate another embodiment of an airbag module 12 comprising a dimensionally stable backup member 36*a*.

In this example, the dimensionally stable backup member 36*a* takes the shape of a rigid T-shaped strut, with the beam of the T being located at the free end 54 of the dimensionally stable backup member 36*a*.

Figure 19:
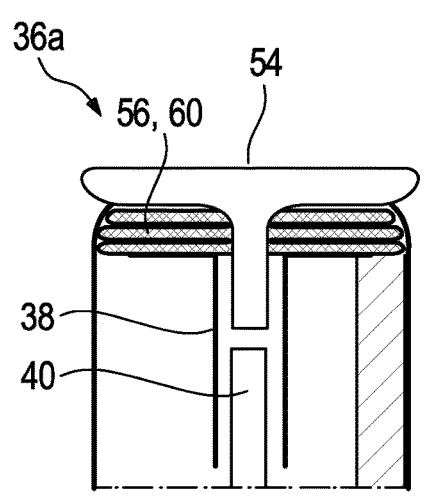

In the initial state, the dimensionally stable backup member 36*a* is completely located in the holder 38 and is not visible from outboard of the vehicle seat 10 (see FIG. 19).

Figure 17:
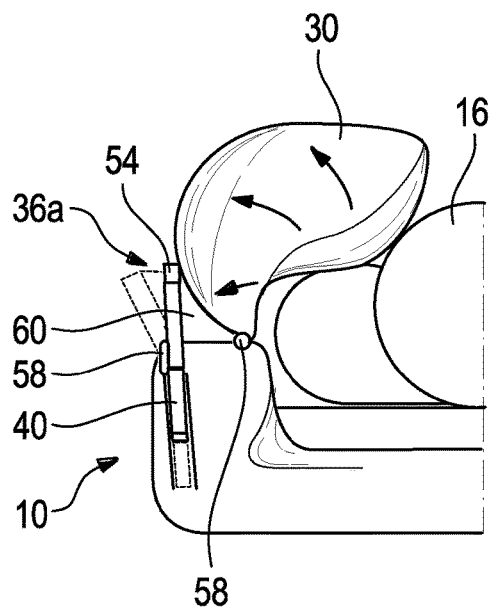
Figure 18:
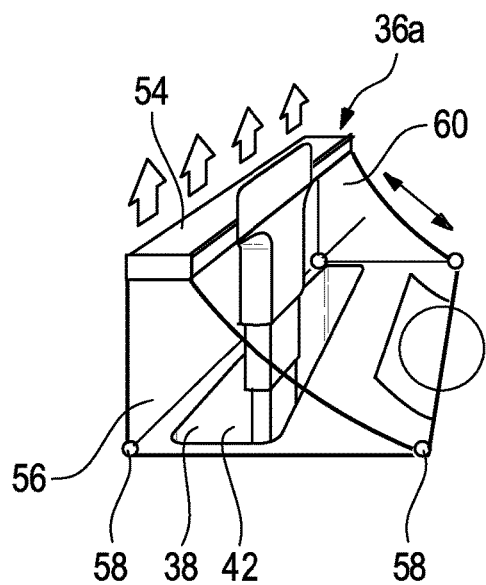
Figure 20:
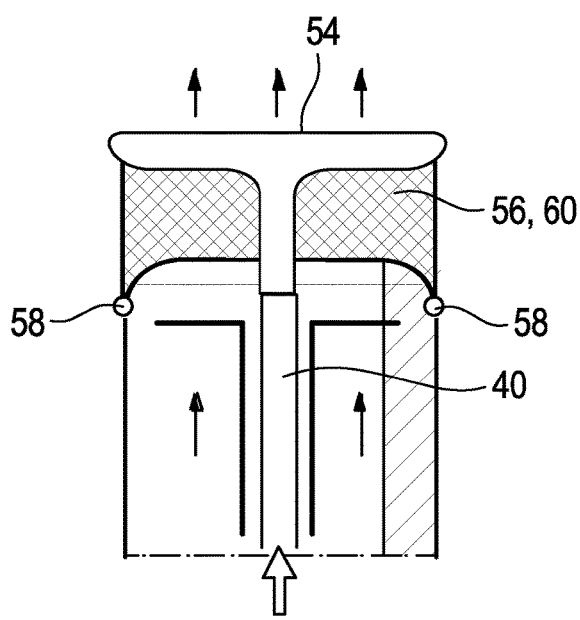
Figure 24:
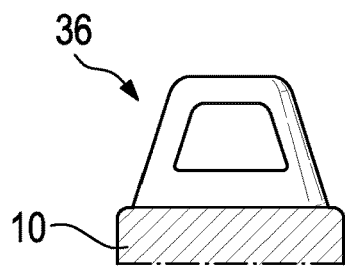
Figure 25:
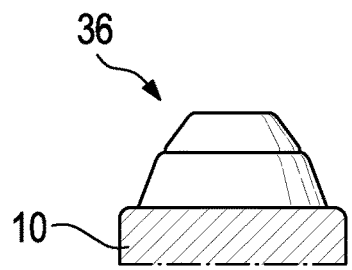
Figure 26:
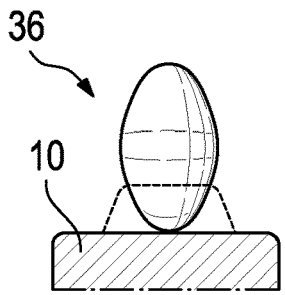
Figure 27:
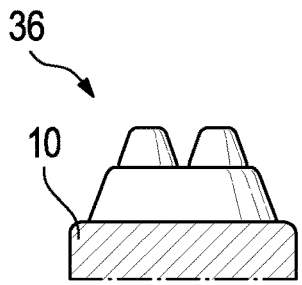
Figure 28:
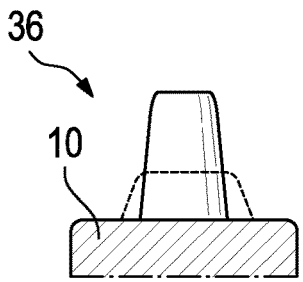
Figure 29:
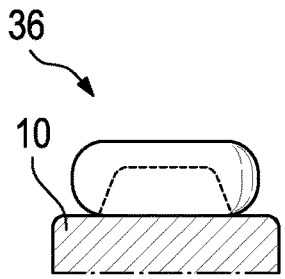
Figure 30:
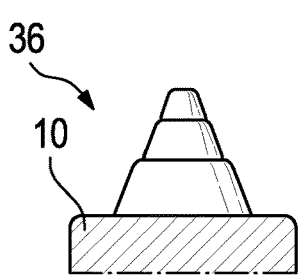
Figure 31:
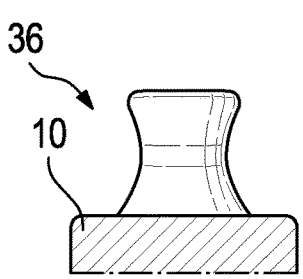
Figure 32:
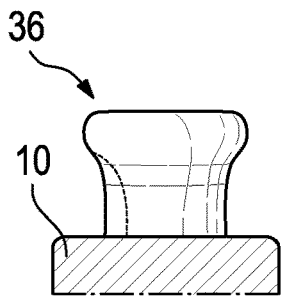
Figure 33:
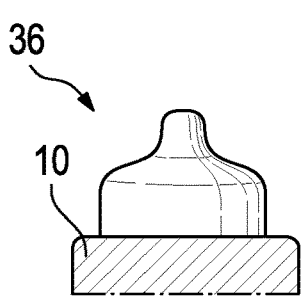
Figure 34:
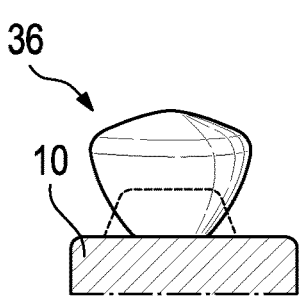
Figure 35:
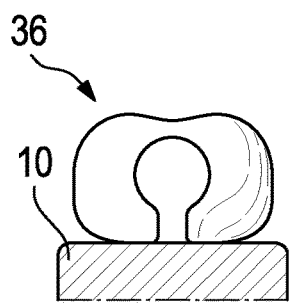
Figure 36:
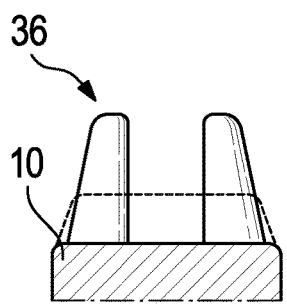
Figure 37:
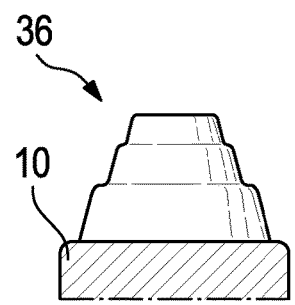
Figure 38:
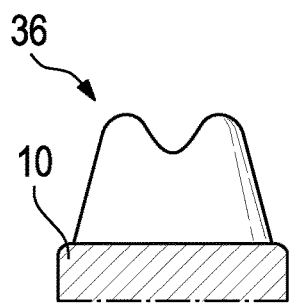
Figure 39:
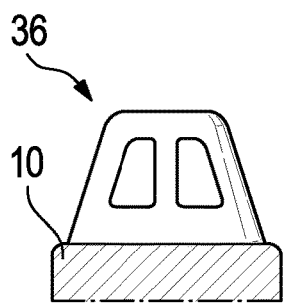
Figure 40:
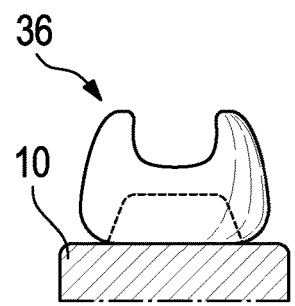
Figure 41:
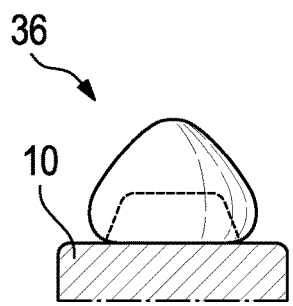
Figure 42:
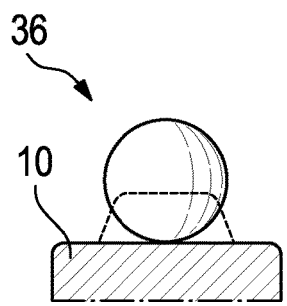
Figure 43:
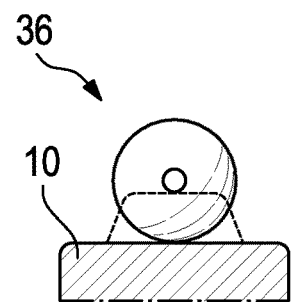

When the backup member 36*a* is transferred to its restraining state, it is pushed out of the holder 38 through the exit opening 42 by a suitable transfer mechanism 40 (see FIGS. 17, 18 and 20).

In addition to the T-shaped strut, the dimensionally stable backup member 36*a* further includes a flexible portion 56 that is made from a netting material, for example, and extends along the beam of the T from the free end 54 to plural fixing points 58 at the module housing 28 or at the vehicle seat 10.

In this example, another flexible portion 60 is provided that is equally attached to the beam of the T and leads to fixing points 58 which are spaced apart from the fixing points 58 of the first flexible portion 56.

In the initial state, the flexible portions 56, 60 are folded and located in the holder 38.

In the restraining state, the rigid T-shaped strut ensures the required stability of the dimensionally stable backup member 36*a*, while the flexible portions 56, 60 increase the area of the backing surface for the restraint airbag 30.

FIGS. 21 to 23 illustrate another example for a dimensionally stable backup member 36*a* having a flexible portion 56.

A fan-shaped framework of rigid struts 62 which are pivotally connected to each other at one end 64 is provided in this case. A flexible portion 56, e.g., made from a netting material, extends between adjacent struts 62.

In the initial state, the struts 62 and the flexible portions 56 fixed therebetween are folded and jointly arranged in the holder 38 (FIG. 23). When the rigid struts 62 are transferred to the restraining state, they are fan-like extended and the flexible portions 56 provided therebetween are spanned (see FIGS. 21 and 22). The struts 62 and the flexible portions 56 are located outboard of the holder 38 in the restraining state, whereas a rod portion 66 attached to the ends 64 is retained in the holder 38.

The spanning can be done, for example, by the outermost flexible portions 56 being fastened to fixing points 58 affixed to the vehicle on the edge of the holder 38 so that a tensile force is automatically produced which spans the rigid struts 62 when the dimensionally stable backup member 36*a* is pushed out of the holder 38.

In FIGS. 24 to 43, various possible shapes of a backup member 36 are shown. Where necessary, also in this case, one or more flexible portions 56 (not shown) could be added.

Figure 44:
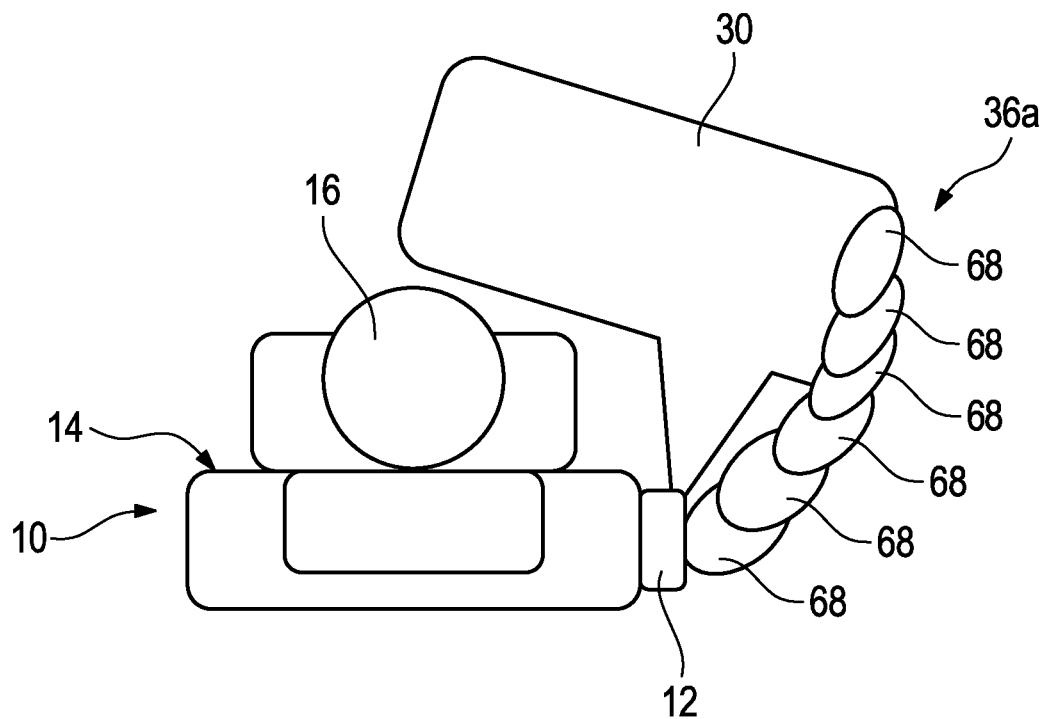

FIG. 44 illustrates another embodiment of a dimensionally stable backup member 36*a*. The dimensionally stable backup member 36*a* is shown in the restraining state. The dimensionally stable backup member 36*a* is made of plural individual rigid sub-elements 68 that are linearly connected to each other and that are accommodated in the holder 38 when compactly telescoped in the initial state (not shown). While they are transferred to the restraining state, the individual sub-elements 68 are displaced relative to each other, with the total length of the dimensionally stable backup member 36*a* being increased. In this example, the entire dimensionally stable backup member 36*a* also takes a shape curved toward the contact area 14.

The individual sub-elements 68 are disk-shaped in this case and are connected to their respective neighbors at opposite edge portions.

Also, a telescopic arrangement would be conceivable.

There could also be provided locking elements which are designed similarly to the meshing structures 52 of FIG. 13, for example, to fix the individual sub-elements 68 in position in the restraining state.

Figure 45:
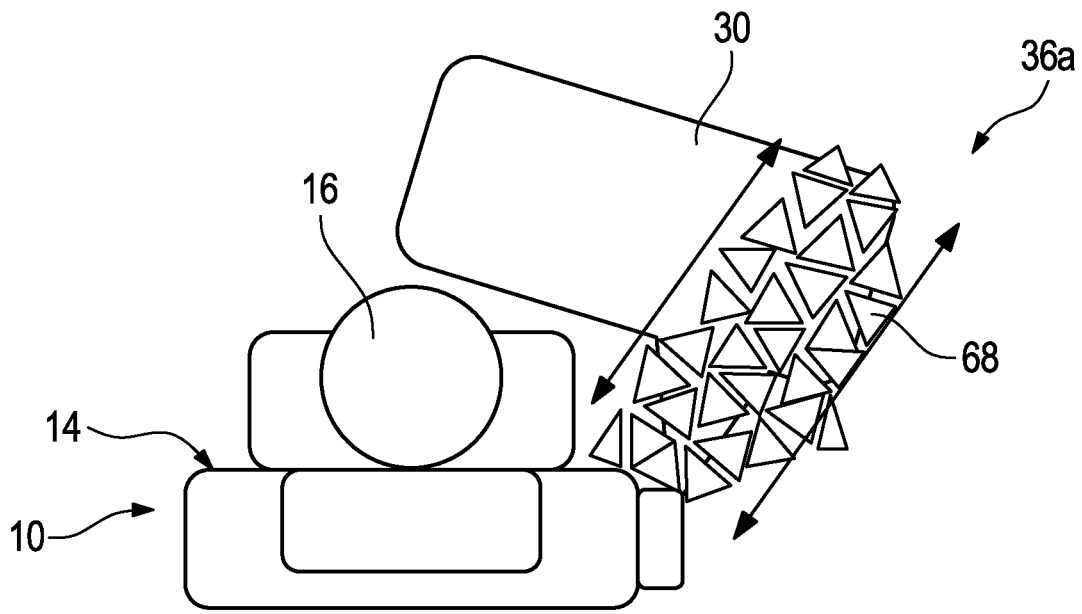

FIG. 45 illustrates another embodiment. In this case, the dimensionally stable backup member 36*a* includes a plurality of sub-elements 68 connected to form an area. Analogously to the just described embodiment, the dimensionally stable backup member 36*a* in the initial state and accommodated in the holder 38 when folded and increases its longitudinal extension, when it is transferred to the restraining state.

For example, a flat material in a specific folding may be used in this case. It is possible to make use of an auxetic material whose rigidity increases transversely to the direction of extension.

Figure 46:
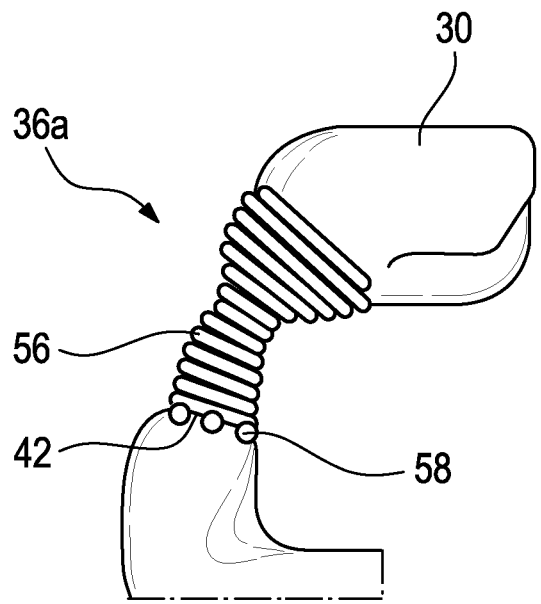
Figure 47:
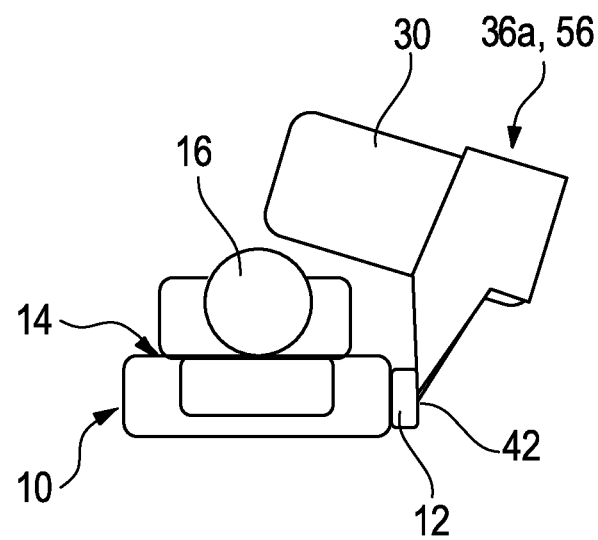
Figure 48:
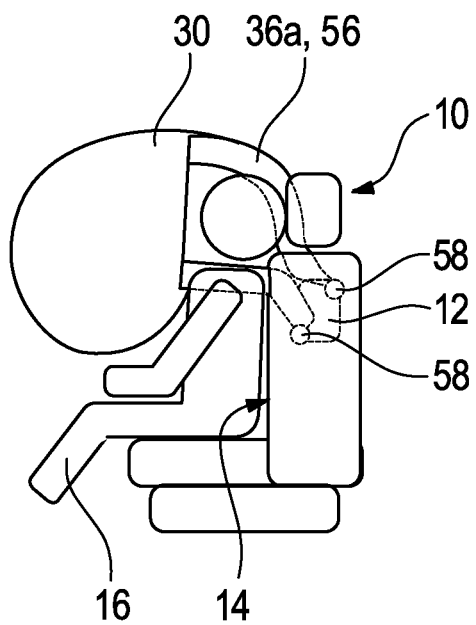

FIGS. 46 to 48 show another embodiment. In this case, the dimensionally stable backup member 36*a* is formed by a flexible portion 56 provided with a curable or solidifying material. For this purpose, quickly curing epoxy resins or electro-rheological or magneto-rheological liquids are taken into account (each with appropriate curing devices not shown here).

A flexible portion 56 provided with an appropriate curable or solidifying material (not shown in detail), such as by impregnating with epoxy resin, is wrapped around the portion of the restraint airbag 30 directly adjacent to the exit opening 42.

As long as the dimensionally stable backup member 36a is accommodated in its holder 38, the material is liquid and the entire dimensionally stable backup member 36a is therefore flexible. While or shortly after reaching the restraining state, the material cures or solidifies so that the flexible portion 56 is stiffened in the restraining state and exerts a backing effect on the restraint airbag 30.

Figure 49:
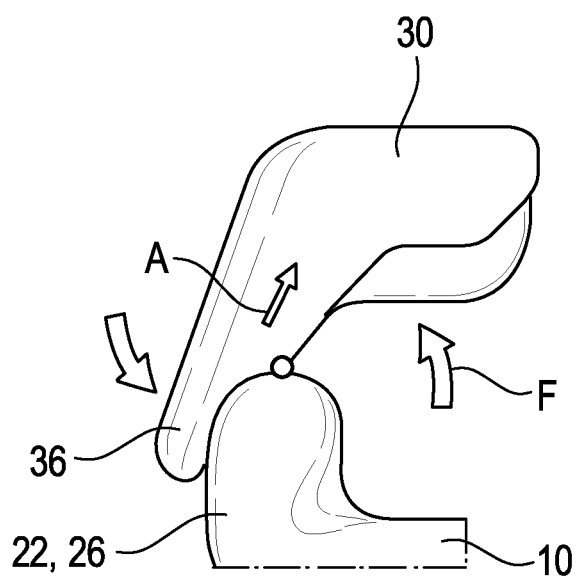
FIGS. 49 to 52 show vehicle seats according to the invention as set forth in further embodiments comprising different backup airbags, in different representations.

FIG. 49 illustrates an embodiment in which the backup member 36 is part of the restraint airbag 30. The backup member 36 forms an inflatable portion of the restraint airbag 30 extending against the general exit direction A (see arrow in FIG. 49) and from the exit opening 42 abuts on the vehicle seat 10 outboard on the backrest 22 or the headrest 26, for example. Due to this shaping, the restraint airbag 30 bears against the vehicle seat 10 when an outwardly directed force F acts upon the same.

FIGS. 50 to 53 illustrate further embodiments. Here, the backup member 36 is realized by a backup airbag 36b, viz. as an inflatable component having a substantially flexible outer cover.

It would also be imaginable, of course, to provide a curing or solidifying material as afore-described on the outer cover of the backup airbag 36b. This applies, by the way, to all embodiments described in the following.

Figure 50:
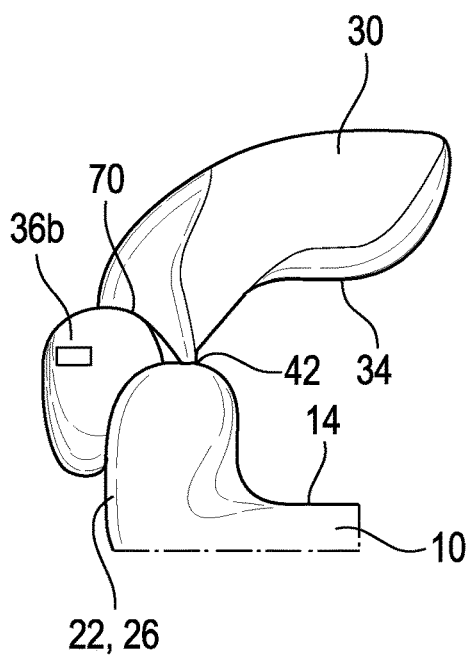

FIG. 50 illustrates the concept. Here, in addition to the restraint airbag 30, one single backup airbag 36b is provided, wherein the restraint airbag 30 is located, in the shown situation of restraint, between the vehicle occupant and, thus, the contact area 14 and the backup airbag 36b. The backup airbag 36b is disposed in the area of the exit opening 42 and is adjacent to the outer face of the vehicle seat 10, in particular to the outer face of the backrest 22 or the headrest 26. In this way, the backup airbag 36b exerts a backing effect on the area of the restraint airbag 30 close to the seat and prevents the latter from being pressed outwards when the occupant 16 engages in the restraint airbag 30.

The backup airbag 36b is filled at a higher internal pressure than the restraint airbag 30 and has a smaller filling volume than the latter.

Basically, there is a contact region 70 in which the backup airbag 36b and the restraint airbag 30 are directly adjacent to each other.

Figure 52:
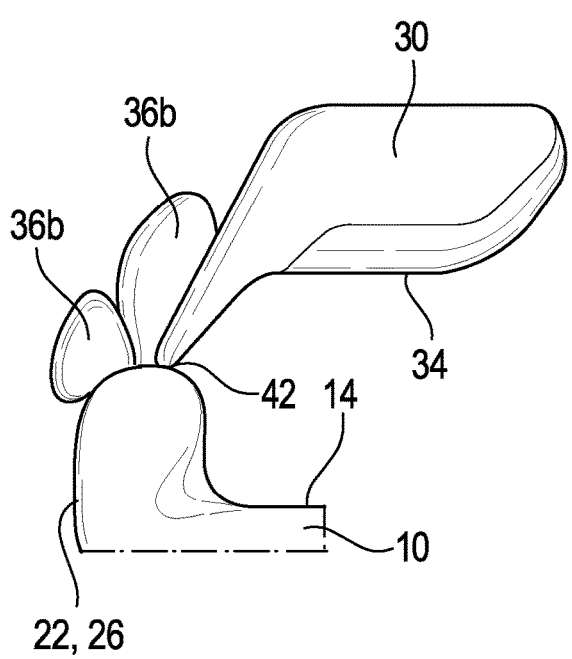
Figure 52A:
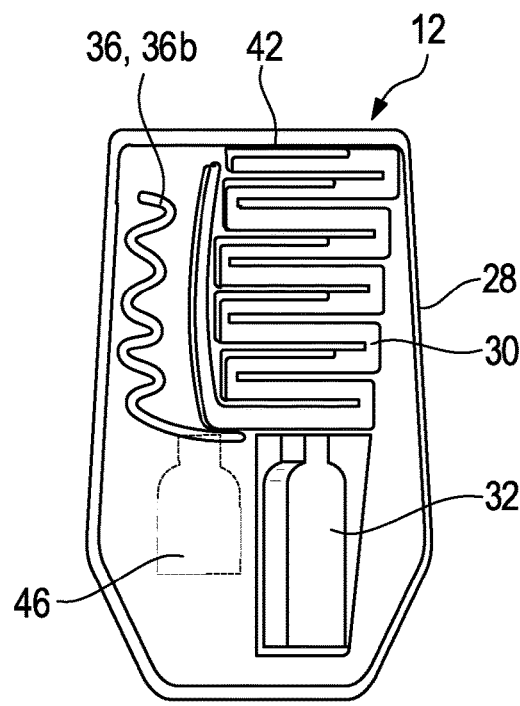
FIG. 52a shows an airbag module according to the invention as set forth in a further embodiment comprising a backup member in the form of a backup airbag.

FIG. 52a generally illustrates an airbag module 12 in which the backup member 36 is in the form of a backup airbag 36b. The airbag module 12 is structured analogously to the airbag modules shown in FIGS. 2 to 6. One or more backup airbags 36b are accommodated, in the initial state, in the module housing 28 together with the restraint airbag 30. The filling gas for the backup airbag(s) 36b is either supplied by the gas generator 32 that also fills the restraint airbag 30, or a separate gas generator 46 is provided (indicated by broken lines in FIG. 52a). This airbag module 12, too, can be installed at positions in the vehicle other than a vehicle seat.

In general, even when a backup airbag 36b is used as backup member 36, it is applicable that said backup airbag 36b in the inflated state abuts on the restraint airbag 30 at a position where the shape of the restraint airbag 30 tends to yield to the action of a force in the direction away from the vehicle occupant, and therefore the restraint airbag 30 must be backed. This backing effect is achieved, for example, exclusively by the backup member 36 or a combination of plural backup members 36. Consequently, the necessity of a backing surface affixed to the vehicle in the area of the restraint airbag 30 is dropped.

Figure 51:
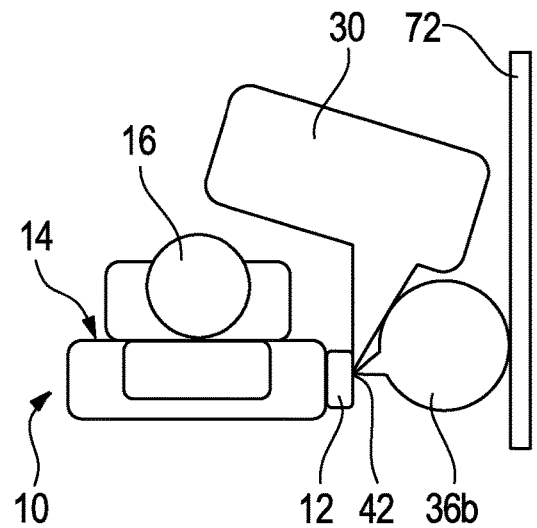

As an alternative, FIG. 51 illustrates an embodiment in which the backup airbag 36b additionally bears against a component 72 affixed to the vehicle, such as a wall that delimits the vehicle interior.

Figure 53:
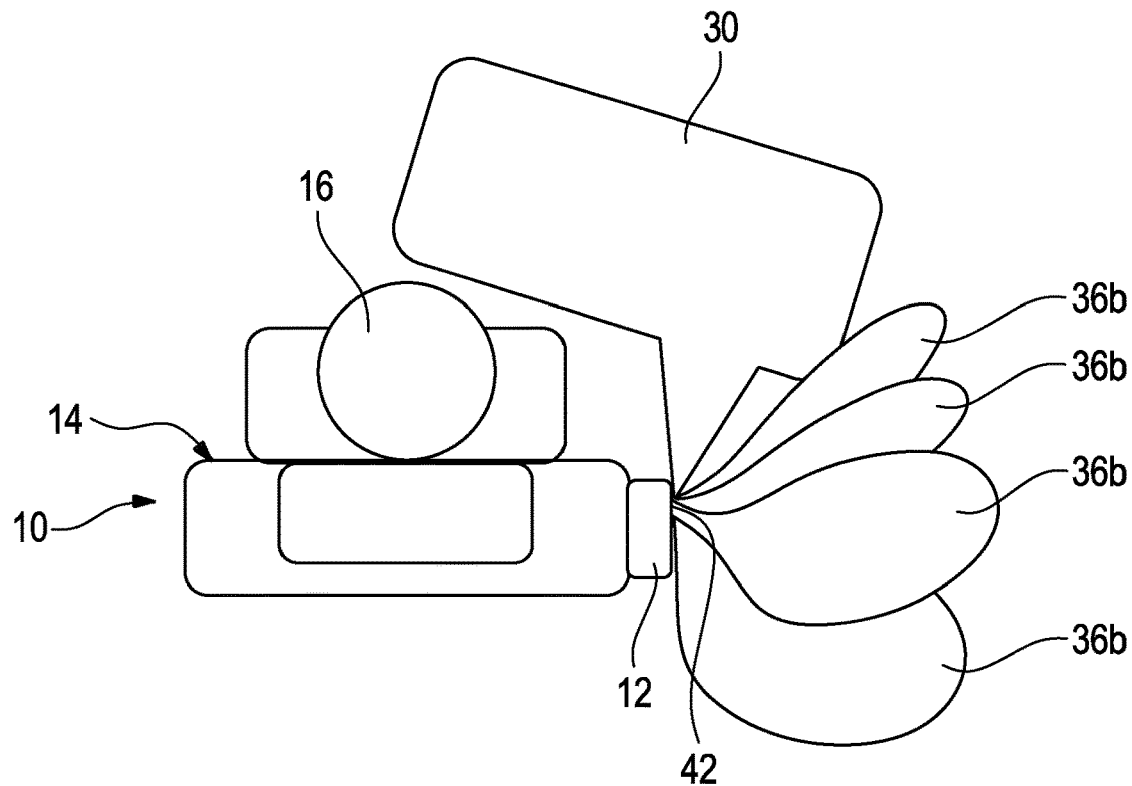
FIG. 53 shows a vehicle seat according to the invention as set forth in a further embodiment comprising plural backup airbags.

FIGS. 52 and 53 show embodiments in each of which plural backup airbags 36b are arranged in series, wherein adjacent central backup airbags 36b mutually back each other.

As a rule, the backup airbag(s) 36b equally exit(s) through the exit opening 42 out of the airbag module 12 where it is/they are accommodated in the initial state together with the folded restraint airbag 30.

Basically, each of the individual backup members 36, 36a, 36b can be transferred from its initial state to its restraining state irrespective of other backup members 36, 36a, 36b. However, it is equally possible to couple backup members 36, 36a, 36b to each other or to the restraint airbag 30 so that said components are jointly moved.

Figure 54:
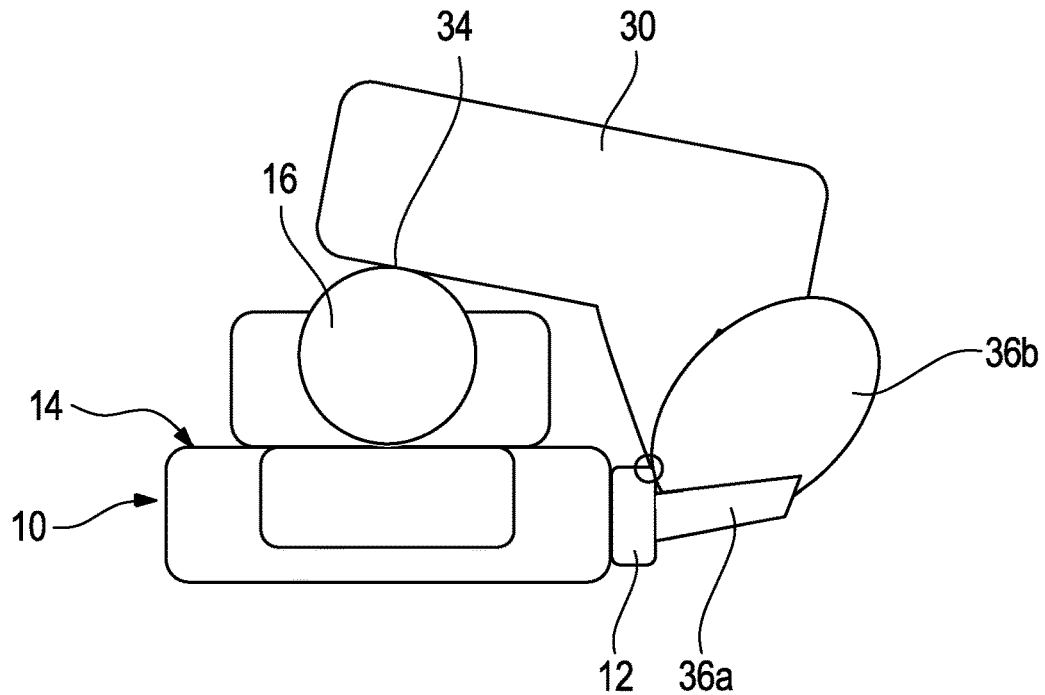
FIGS. 54 to 67 show vehicle seats according to the invention as set forth in further embodiments comprising different combinations of dimensionally stable backup members and backup airbags in different representations.

FIGS. 54 to 67 illustrate further embodiments in which both a dimensionally stable backup member 36a and a backup airbag 36b are provided as backup members 36. In this example, in the restraining state the backup airbag 36b is always interposed between the restraint airbag 30 and the dimensionally stable backup member 36a. FIG. 54 illustrates this concept.

In the initial state, the restraint airbag 30 and the two backup members 36a, 36b are jointly accommodated in the airbag module 12.

On principle, all concepts for dimensionally stable backup members 36a and backup airbags 36b described in the entire application can be freely combined in any number with each other and with other types of described backup members 36. The concretely described embodiments are merely examples.

Figure 55:
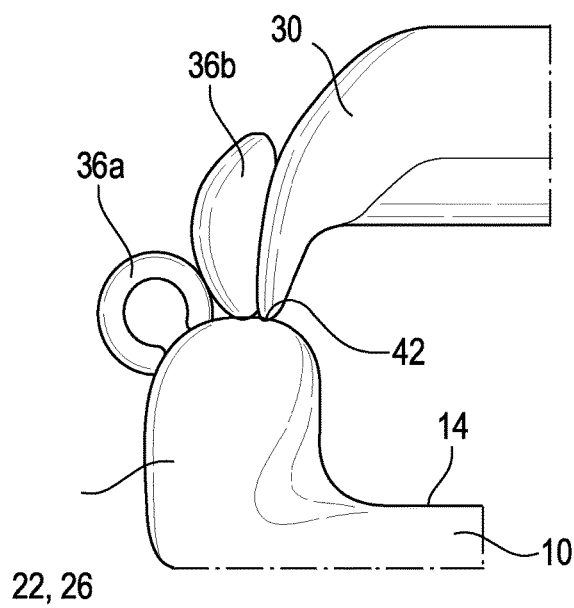
Figure 56:
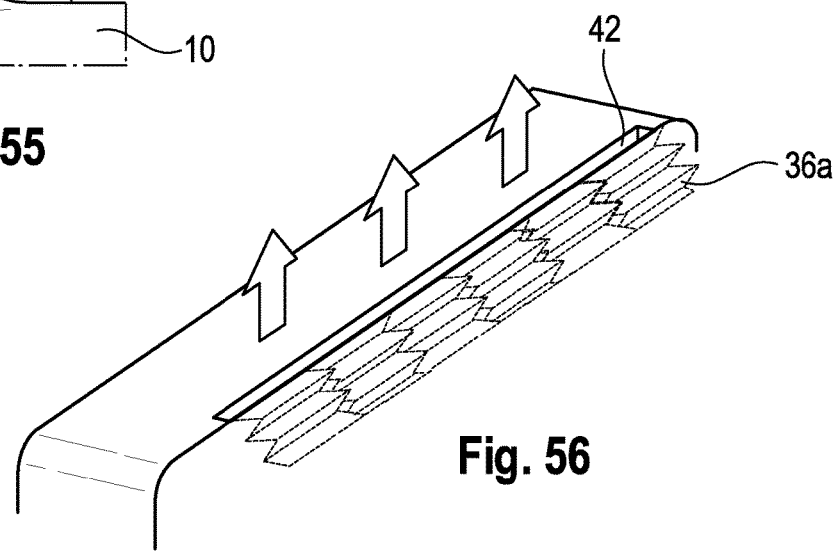
Figure 57:
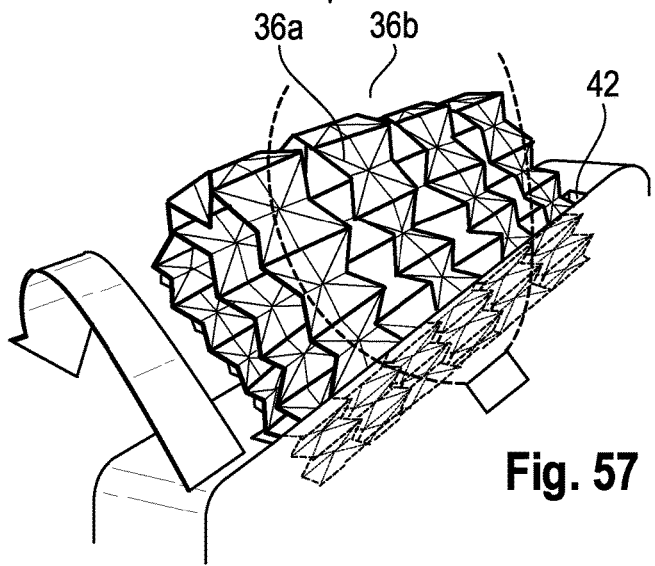

FIGS. 55 to 57 show an embodiment in which the dimensionally stable backup member 36a rolls up, when it exits the exit opening 42, to the outside, i.e., directed away from the contact area 14. This behavior can be achieved by a suitable material, such as a thin flat material having a specific folding or a different specific structure. What is important is the fact that a pretension toward one side is produced. A known example hereof are snap bracelets.

Figure 58:
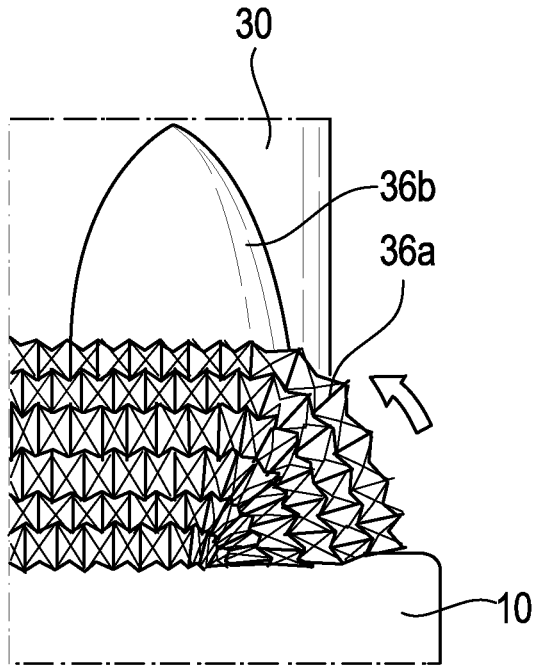
Figure 59:
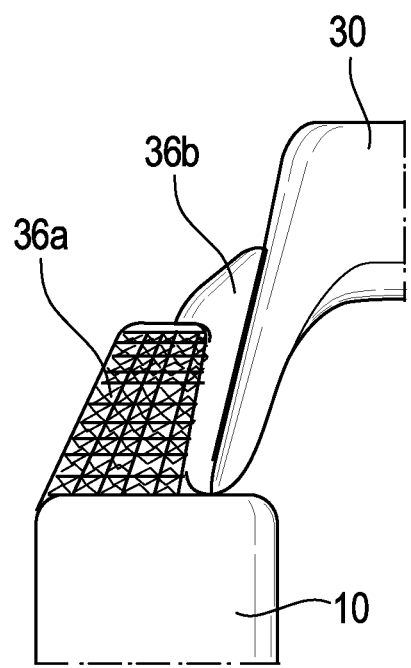

FIGS. 58 and 59 show an embodiment in which the dimensionally stable backup member 36a is made from an auxetic material. When the backup member 36a exits the exit opening 42, its thickness is increased perpendicularly to the direction of extension, whereby in turn the backing action is increased.

Figure 60:
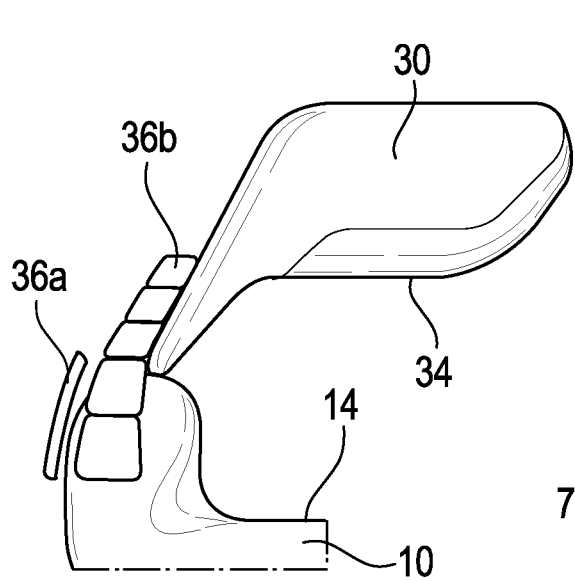

FIG. 60 shows an embodiment in which the backup airbag 36b includes plural chambers telescoped into each other which fill when they are transferred to the restraining state. The dimensionally stable backup member 36a may be selected at will.

Figure 61:
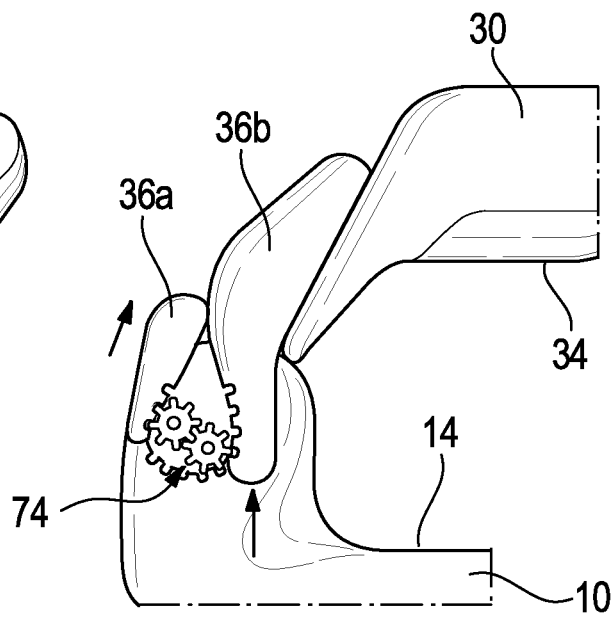

FIG. 61 illustrates an embodiment in which the dimensionally stable backup member 36a and the backup airbag 36b are coupled via a gear unit 74. For this purpose, the sides of the backup members 36a, 36b facing the gear unit 74 have appropriate structures in which the gearwheels can engage.

Figure 62:
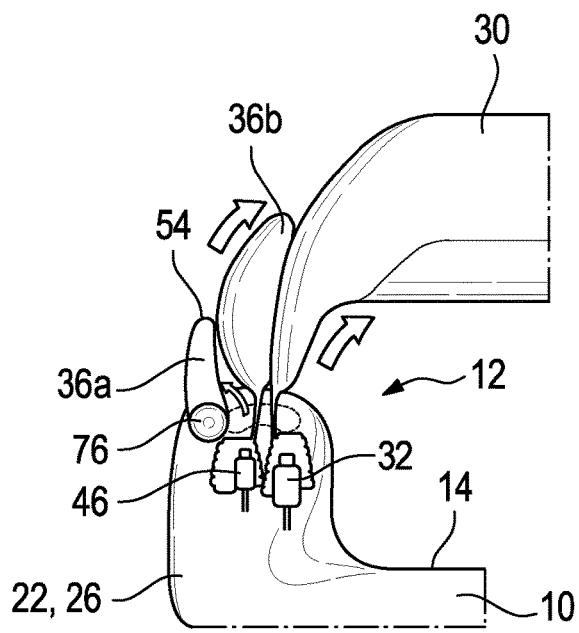
Figure 63:
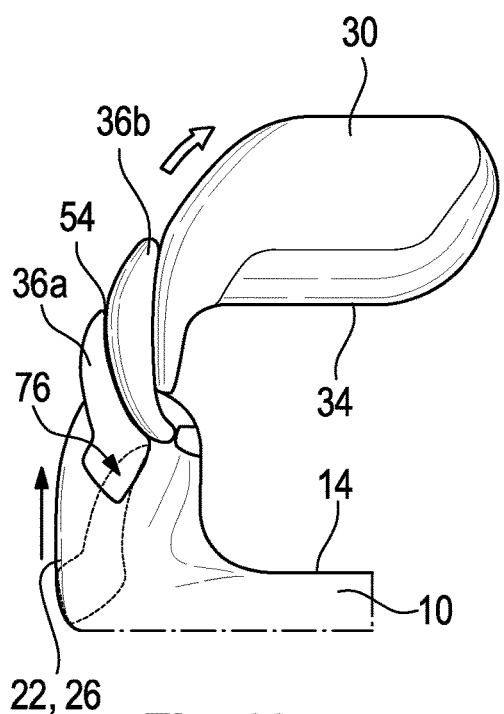
Figure 64:
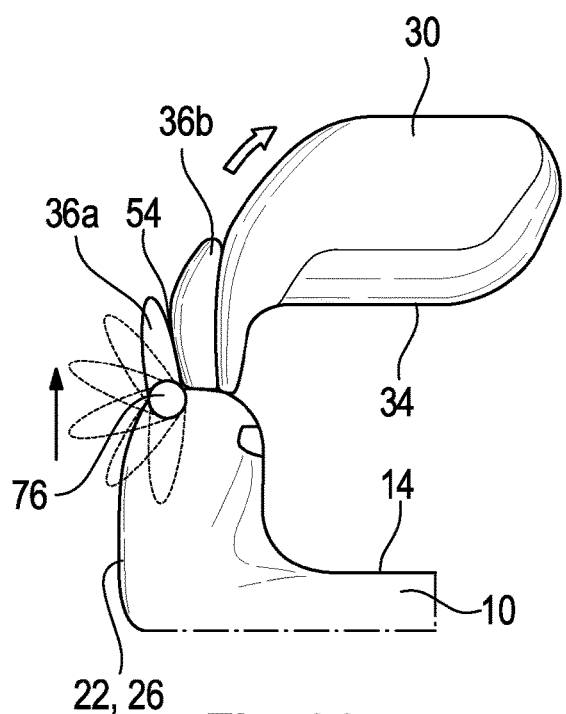

FIGS. 62 to 64 show embodiments in which the dimensionally stable backup member 36a is pivotally fixed on the vehicle seat 10. In the initial state (in broken lines in the Figures) the dimensionally stable backup member 36a is located in a suitable holder inside the vehicle seat 10 so that it is not visible from outside. For transferring it to the restraining state, it is pivoted about an axis 76 so that its free end 54 comes to lie outboard of the vehicle seat and constitutes a reaction surface to the backup airbag 36b.

Irrespective of the pivotable arrangement of the dimensionally stable backup member 36a, FIG. 62 illustrates a variant in which each of the backup airbag 36b and the restraint airbag 30 is assigned to a separate gas generator 32, 46 (or a separate stage of a multi-stage gas generator).

The gas supply to the backup airbag 36b is activated first, before the gas supply to the restraint airbag 30 is activated. As a result, the backup airbag 36b opens a cover (not shown) of the module housing 28 of the airbag module 12.

The restraint airbag 30 is optionally fastened to the backup airbag 36b and, when the backup airbag 36b is deployed, is also pulled out of the module housing 28.

This step takes place especially before the gas supply to the restraint airbag 30 is activated.

In an alternative variant, the backup airbag 36b and the restraint airbag 30 are filled by the same gas generator 32 which to this end has two different outlets.

The backup airbag 36b is inflated at a higher pressure than the restraint airbag 30 and maintains the higher pressure throughout the entire service life. To achieve this, a membrane that maintains the difference in pressure may be provided, for example.

Figure 65:
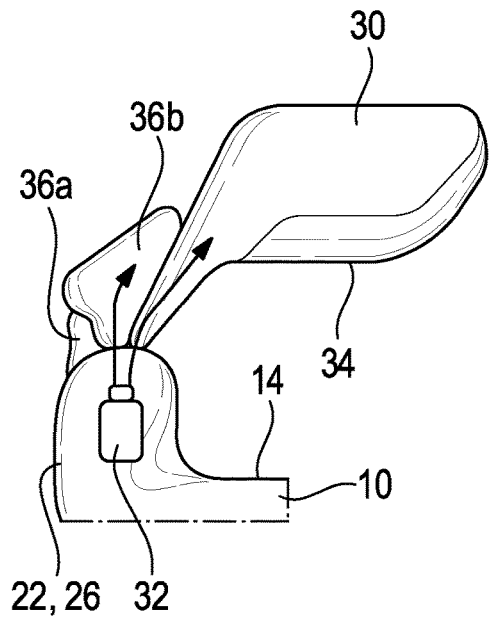
Figure 66:
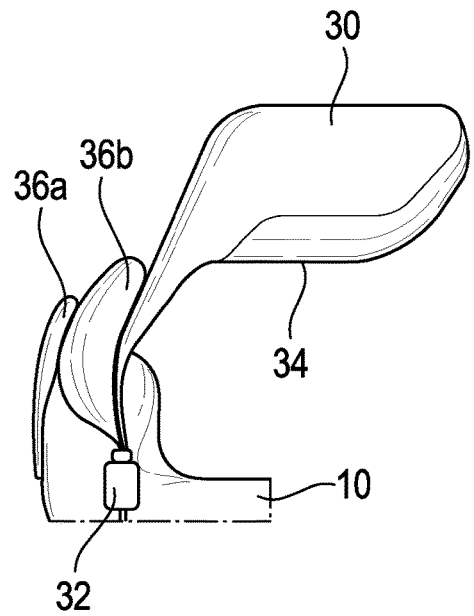
Figure 67:
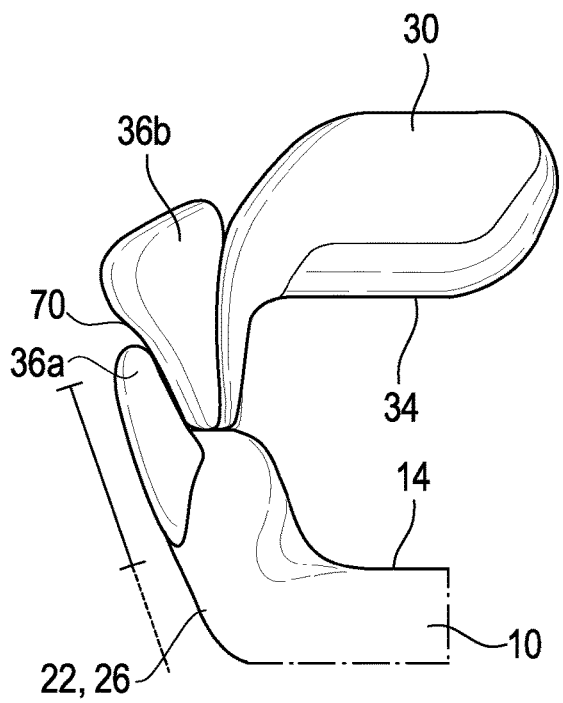

FIGS. 65 to 67 illustrate embodiments in which the dimensionally stable backup member 36a is configured as a firm part of the vehicle seat 10, for example as a part of a rigid seat frame. In the initial state, too, the dimensionally stable backup member 36a is visible from outside in these embodiments and is part of the side bolster of the backrest 22 or the headrest 26, for example. In the situation of restraint, the inflated backup airbag 36b bears against the inner face 47 of the dimensionally stable backup member 36a.

FIG. 67 moreover shows a form fit between the dimensionally stable backup member 36a and the backup airbag 36b that is obtained by a complementary shaping of the surfaces of the backup members 36a, 36b adjacent in the contact region 70 and that additionally improves the backing action to the restraint airbag 30.

As already described in the foregoing, airbag modules 12 may be provided on both sides of the vehicle seat 10. The restraint airbags 30 are designed so that opposite restraint airbags 30 contact each other in front of the vehicle occupant 16.

Figure 68:
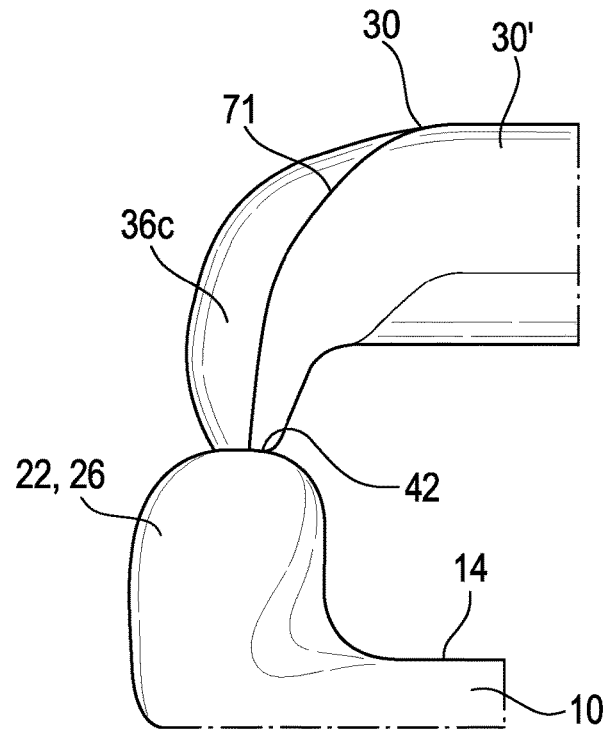
FIG. 68 shows an airbag module according to the invention as set forth in a further embodiment comprising a backup member in the form of a backup chamber.

FIG. 68 shows an embodiment in which the backup member 36 is in the form of a backup chamber constituting an inflatable portion of the restraint airbag 30. The restraint airbag 30 is in the form of a multi-chamber airbag, the backup chamber 36c and the restraint chamber 30' being separated by a partition wall 71.

In the shown filled state, the backup chamber 36c is filled at a higher internal pressure than the restraint chamber 30' of the restraint airbag 30. The backup chamber 36c and the restraint chamber may be filled with gas by the same gas generator, wherein the latter may include, e.g., two gas outlets to this end so that in the backup chamber 36c that has a smaller volume than the restraint chamber 30' a higher internal pressure can be reached.

Alternatively, the partition wall 71 may comprise overflow openings. Those overflow openings may be particularly closable, wherein the overflow openings are closed, for example, in response to the internal pressure of the backup chamber 36c or the restraint chamber 30' or in response to deployment of the restraint airbag 30, in particular the restraint chamber 30', or the backup chamber 36c. For example, overflow openings including closure elements can be used, as they are shown, e.g., in DE 10 2019 101 284.8 using the example of a knee airbag.

Figure 69:
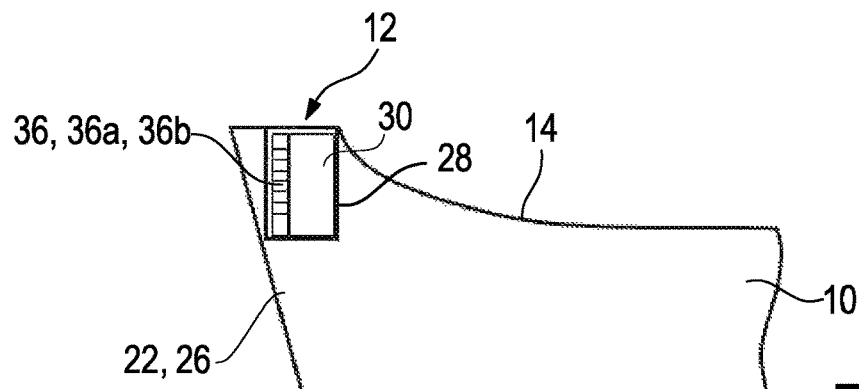
FIGS. 69 to 71 show an airbag module according to the invention as set forth in a further embodiment, wherein different stages of a further backup member between an initial state and a restraining state are illustrated.
Figure 70:
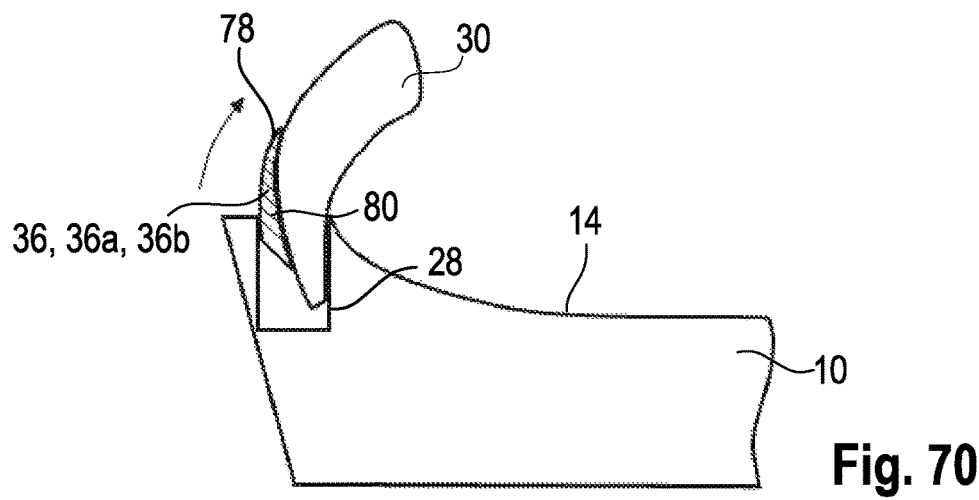
Figure 71:
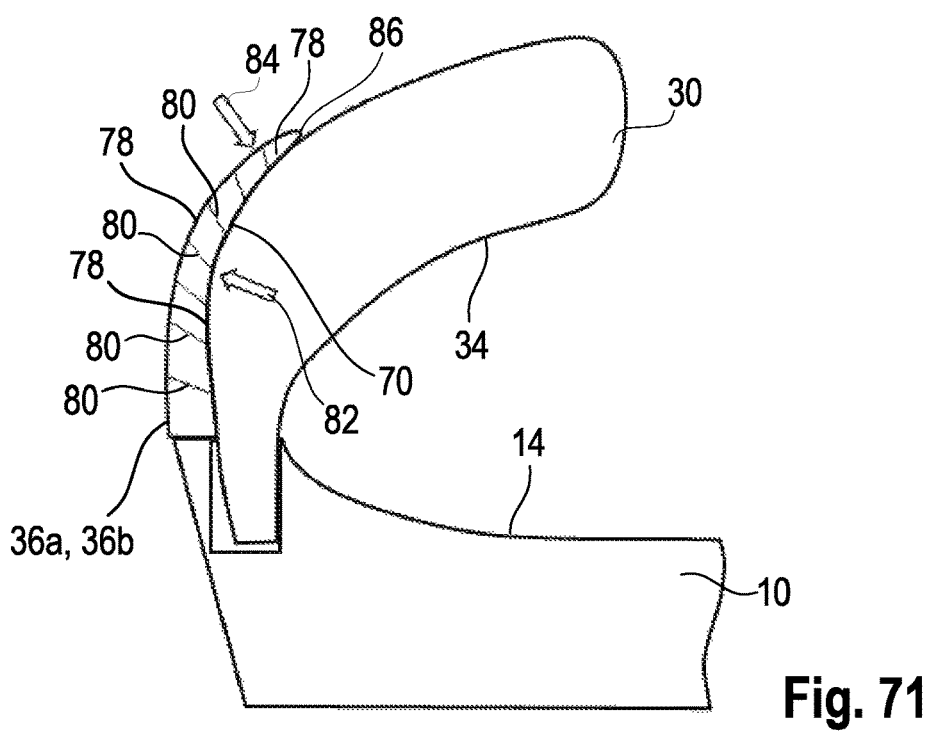

FIGS. 69 to 71 illustrate different times of deployment of the restraint airbag 30 and the backup member 36 between an initial state and a restraining state, wherein in this embodiment the backup member 36 has two leg elements 78 between which plural cross struts 80 connecting the leg elements 78 are arranged. In the restraining state (FIG. 71), the leg elements 78 are arranged in portions substantially V-shaped relative to each other. Between the leg elements 78, plural cross struts 80 are arranged in a rung-like manner, the length of the cross struts 78 being reduced toward the joint tip 86 of the leg elements 78.

The structure of the backup member 36 has a structure based on the two-ray base element of the bone fish fin, whereby the backup member 36, when force is applied by the restraint airbag 30 in the contact region 70 shown by the arrow 82, does not back away in the direction of force (arrow 82), but the tip 86 of the backup member 36 moves in a direction opposite to the direction of force, as shown by the arrow 84, and thus stabilizes the restraint airbag 30.

The leg elements 78 may be configured particularly as inflatable elements and/or as resiliently flexible elements and the cross struts 80 may be configured particularly as inflatable elements and/or as dimensionally stable elements.

For example, the leg elements 78 and/or the cross struts 80 can be manufactured from the same fabric as the restraint airbag and can form plural inflatable chambers, for example. As an alternative, the leg elements 78 and/or the cross struts 80 can be made from suitable plastics, such as polyurethanes, for example. As is evident from FIGS. 69 to 71, in such embodiment the leg elements 78 and the cross struts 80 are preferably connected to each other so that in the initial state (FIG. 69) the backup member 36 can be stowed in a compact manner, e.g., in the module housing 28, and deploys to its final shape which it has in the restraining state (FIG. 71) only when the airbag module 12 has been activated.

Figure 72:
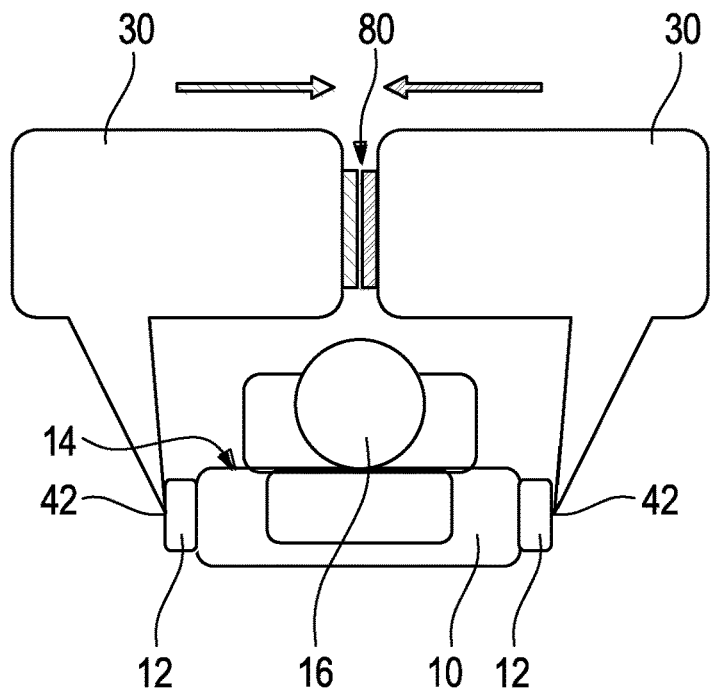
FIGS. 72 and 73 show vehicle seats according to the invention as set forth in further embodiments, wherein the interaction of two opposite restraint airbags is illustrated.
Figure 73:
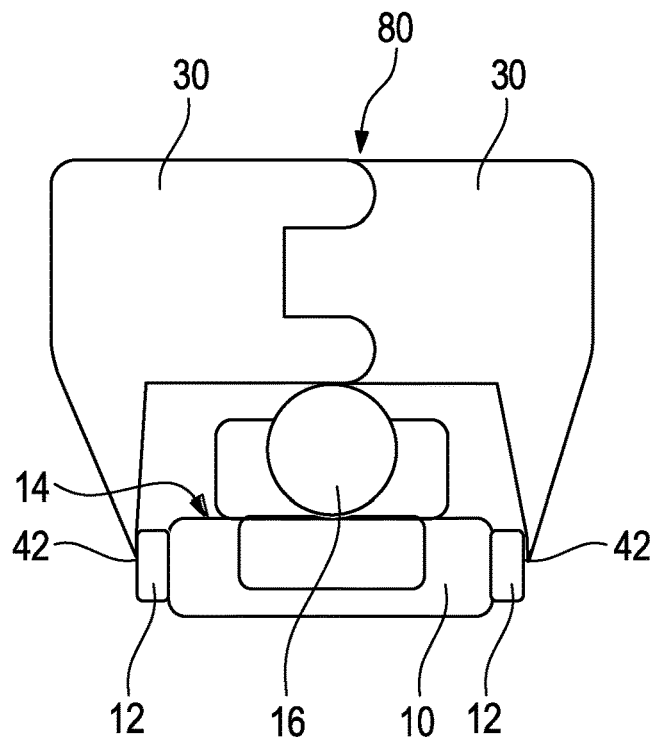

In FIGS. 72 and 73, embodiments are shown in which each of the two restraint airbags 30 located on different sides of the vehicle seat 10 has a fixing structure 80 that detachably fixes the two restraint airbags 30 to each other. In the case of FIG. 68, the fixing structures 80 are formed by magnets, whereas in the case of FIG. 69 a form fit is chosen by the complementary design of the adjacent surfaces of the two restraint airbags 30.

The invention claimed is:

1. An airbag module comprising a restraint airbag which is inflated in a situation of restraint and, in an inflated state, has a restraining effect on an occupant, and at least one backup member which, in a restraining state, is at least in portions in contact with the inflated restraint airbag and is configured to back the restraint airbag and particularly absorb a force applied to the restraint airbag by contacting a vehicle occupant, wherein the restraint airbag in the inflated state is interposed between the backup member and the vehicle occupant, the backup member being arranged on or in the airbag module in an initial state, wherein at least one backup member is provided that includes at least two leg elements which are arranged at least in portions substantially V-shaped relative to each other and between which at least one cross strut connecting the leg elements is arranged.

2. The airbag module according to claim 1, wherein the backup member is accommodated inside the airbag module.

3. The airbag module according to claim 1, wherein the backup member is in the form of an element separate from the airbag module.

4. The airbag module according to claim 1, wherein in the restraining state the backup member is arranged in the area of an exit opening of the restraint airbag out of the airbag module.

5. The airbag module according to claim 1, wherein in an initial state the at least one backup member is arranged in a holder, wherein a transfer mechanism is provided for moving, in a situation of restraint, the at least one backup member out of the holder into the restraining state.

6. The airbag module according to claim 5, wherein the transfer mechanism is formed so that the backup member is firmly fixed to an outer wall of the restraint airbag, or in that the transfer mechanism comprises a gas generator or a mechanical drive.

7. The airbag module according to claim 1, wherein at least one backup member is provided that is a dimensionally stable backup member in the form of a component which is rigid at least in portions in the restraining state.

8. The airbag module according to claim 7, wherein at least portions of the dimensionally stable backup member are made of an auxetic material.

9. The airbag module according to claim 7, wherein the dimensionally stable backup member is arranged so that it is linearly displaced, swiveled or rotated for being transferred from the initial state to the restraining state.

10. The airbag module according to claim 7, wherein the dimensionally stable backup member comprises a flexible portion which, in the initial state, is folded and arranged in the holder and which unfolds when it is transferred to the restraining state.

11. The airbag module according to claim 1, wherein at least one backup member is provided which is an inflatable backup airbag.

12. The airbag module according to claim 11, wherein the backup airbag is filled at a higher internal pressure than the restraint airbag.

13. The airbag module according to claim 11, wherein there are provided plural backup airbags which mutually back each other.

14. The airbag module according to claim 1, wherein at least one backup member is configured as a backup chamber which forms an inflatable portion of the restraint airbag, wherein the backup chamber is filled at a higher internal pressure than a restraint chamber of the restraint airbag.

15. The airbag module according to claim 7, wherein at least one backup member configured as a dimensionally stable backup member as well as at least one backup member in the form of a backup airbag and/or a backup chamber are provided, wherein the backup airbag and/or the backup chamber is/are arranged, in the restraining state, between the restraint airbag or between the restraint chamber of the restraint airbag and the dimensionally stable backup member.

16. The airbag module according to claim 1, wherein plural cross struts are interposed between the leg elements, wherein, in the cross-section of the backup member, the cross struts are arranged especially in a rung-like manner between the leg elements and the length of the cross struts is reduced toward the joint tip.

17. The airbag module according to claim 1, wherein the leg elements are configured as inflatable elements and/or as resiliently flexible elements and the cross struts are configured as inflatable elements and/or as dimensionally stable elements.

18. A vehicle seat, comprising at least one airbag module according to claim 1, wherein the restraint airbag is inflated in a situation of restraint and, in an inflated state, has a restraining effect on the occupant on a contact area of the vehicle seat, wherein the at least one backup member in a restraining state is in contact, at least in portions, with the inflated restraint airbag and can exert a force directed toward the contact area on the restraint airbag, wherein the restraint airbag is located between the contact area and the backup member.

19. The vehicle seat according to claim 18, wherein there are provided at least two airbag modules which are arranged on each side of the contact area and which are arranged on a seat base, on-a backrest or on a headrest.

20. A vehicle comprising at least one airbag module according to claim 1.

21. A vehicle comprising a vehicle seat according to claim 18.

22. The airbag module according to claim 1, wherein the backup member is accommodated inside a module housing of the airbag module.

* * * * *